United States Patent
Yoshida et al.

(10) Patent No.: US 7,626,901 B2
(45) Date of Patent: Dec. 1, 2009

(54) METHOD AND APPARATUS FOR RECORDING WRITE-ONCE TYPE OPTICAL RECORDING MEDIUM HAVING DEFECTIVE MANAGEMENT AREAS

(75) Inventors: Masayoshi Yoshida, Tokorozawa (JP); Takeshi Koda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 521 days.

(21) Appl. No.: 11/523,610

(22) Filed: Sep. 20, 2006

(65) Prior Publication Data

US 2007/0014200 A1    Jan. 18, 2007

Related U.S. Application Data

(62) Division of application No. PCT/JP2005/004620, filed on Mar. 16, 2005.

(30) Foreign Application Priority Data

Mar. 22, 2004    (JP) ............................. 2004-082527

(51) Int. Cl.
*G11B 20/10*    (2006.01)
(52) U.S. Cl. .................. 369/47.14; 369/53.17; 714/710
(58) Field of Classification Search .............. 369/47.14, 369/53.17, 53.25, 275.3; 714/710, 711
See application file for complete search history.

(56) References Cited

U.S. PATENT DOCUMENTS

| | | | |
|---|---|---|---|
| 5,526,335 A * | 6/1996 | Tamegai | 369/53.16 |
| 6,279,089 B1 * | 8/2001 | Schibilla et al. | 711/162 |
| 6,615,363 B1 | 9/2003 | Fukasawa | |
| 7,027,241 B2 * | 4/2006 | Chu et al. | 360/31 |
| 7,277,371 B2 * | 10/2007 | Terada et al. | 369/53.16 |
| 7,289,404 B2 * | 10/2007 | Park et al. | 369/53.17 |
| 7,492,679 B2 * | 2/2009 | Yoshida et al. | 369/47.14 |
| 7,496,805 B2 * | 2/2009 | Yoshida et al. | 714/710 |
| 2004/0179445 A1 | 9/2004 | Park et al. | |
| 2005/0207262 A1 | 9/2005 | Terada et al. | |
| 2006/0156056 A1 * | 7/2006 | Yoshida et al. | 714/5 |
| 2007/0014201 A1 * | 1/2007 | Yoshida et al. | 369/275.3 |
| 2007/0101211 A1 * | 5/2007 | Chiang et al. | 714/710 |
| 2008/0232231 A1 * | 9/2008 | Yoshida et al. | 369/275.3 |

FOREIGN PATENT DOCUMENTS

EP    1 505 597    2/2005

(Continued)

OTHER PUBLICATIONS

"White paper Blu-ray Disc Format, 1.B Physical Format Specifications for BD-R", Blu-ray Disc Founders, Aug. 2004, pp. 1-33, XP-002324152.

*Primary Examiner*—Tan X Dinh
(74) *Attorney, Agent, or Firm*—Young & Thompson

(57) ABSTRACT

A write-once-type recording medium (10) is provided with: a data area (11) to record therein record data; and a plurality of management areas in which a plurality of types of management information for managing the record data and index information for indicating newest management information can be recorded a plurality of times, each of the plurality of management areas having a setup area for recording therein a management information block including a plurality of types of management information constructed from the newest management information and the index information indicating the plurality of types of management information constructed from the newest management information.

4 Claims, 20 Drawing Sheets

FOREIGN PATENT DOCUMENTS

| | | |
|---|---|---|
| JP | 10-83658 | 3/1998 |
| JP | 11-185390 | 7/1999 |
| JP | 2001-84115 | 3/2001 |
| JP | 2002-63765 | 2/2002 |
| JP | 2003-331526 | 11/2003 |
| KR | 2004-0023127 | 3/2004 |
| KR | 20050109895 | 11/2005 |
| KR | 20050109989 | 11/2005 |
| WO | WO 03/030173 | 4/2003 |
| WO | WO 2004/077415 | 9/2004 |
| WO | WO 2004/077433 | 9/2004 |
| WO | WO 2004/081922 | 9/2004 |
| WO | WO 2005/073971 | 8/2005 |

\* cited by examiner

| Defect address | Spare address | Other information |
|---|---|---|
| Address aaaa | Address gggg | |
| Address bbbb | Address kkkk | |
| Address cccc | Address mmmm | |
| Address dddd | Address nnnn | |
| ⋮ | ⋮ | |

142A

METHOD AND APPARATUS FOR RECORDING WRITE-ONCE TYPE OPTICAL RECORDING MEDIUM HAVING DEFECTIVE MANAGEMENT AREAS

TECHNICAL FIELD

The present invention relates to a write-once-type recording medium, a recording apparatus for and a recording method of recording record data onto the write-once-type recording medium, a reproducing apparatus and a reproducing method for the write-once-type recording medium, and a computer program which makes a computer function as the recording apparatus.

BACKGROUND ART

In order to record and read record data on a high-density recording medium, such as an optical disc, a magnetic disc and a magneto optical disc, various management information is recorded on the recording medium. For example, defect management information, as one specific example of the management information, is used for "defect management", which is a technique of improving the reliability of the recording and reading of record data on the recording medium. Namely, when there are scratches, dusts or deterioration (which are collectively referred to as a "defect") on the recording medium, data to be recorded or already recorded at the position of the defect is recorded into another area on the recording medium (which is referred to as a "spare area"). As described above, by evacuating the record data which is possibly imperfectly or incompletely recorded or read because of the defect to the spare area, it is possible to improve the reliability of the recording and reading of the record data (refer to a patent document 1).

In general, a defect list is generated to perform the defect management. On the defect list, there are recorded address information indicating the position of a defect on the recording medium, and address information indicating a position in the spare area (e.g. a recording position in the spare area) to which the data to be recorded or already recorded at the position of the defect is evacuated.

In general, the defect list is generated when the recording medium is initialized or formatted. It is also generated when the record data is recorded onto the recording medium. If the record data is recorded and rewritten several times, the defect list is generated or updated every time the record data is recorded and rewritten.

When the record data is recorded onto the recording medium, the defect list is referred to. For this, the record data can be recorded onto the recording medium while keeping away from the position of a defect. On the other hand, the defect list is also referred to when the record data recorded on the recording medium is reproduced. This makes it possible to surely read both the record data which is recorded in a normal recording area and the record data which is recorded in the spare area because of the presence of a defect, on the basis of the defect list.

The defect list is generally recorded into a specific area on the recording medium, which is a target of the generation or updating of the defect list. Then, the defect list is read from the recording medium, when the record data recorded on the recording medium is reproduced next or when other record data is rewritten or additionally recorded (or written once) next. Then the defect list is referred to in a reading operation by a reading apparatus or in a reproduction operation by a reproducing apparatus. Patent document 1: Japanese Patent Application Laying Open NO. Hei 11-185390

DISCLOSURE OF INVENTION

Subject to be Solved by the Invention

By the way, the defect list is recorded in a specific area on the recording medium. For example, in the case of a rewritable optical disc using a blue laser, the defect list is recorded in a predetermined area (which is hereinafter referred to as a "defect management area") reserved in a lead-in area or lead-out area on the disc.

As described above, the defect list is updated every time the record data is recorded and rewritten. Then, the defect list is overwritten in the defect management area on the recording medium, which is a target of the recording and rewriting, every time the defect list is updated by the recording and rewriting of the record data. Namely, the defect list in the defect management area is rewritten every time the defect list is updated.

By the way, such updating of the defect list by rewriting it can be realized only in the case where the recording medium is a rewritable-type. In the case where the recording medium is a so-called "write-once-type recording medium" which allows the recording only once at each position, such as a write-once-type optical disc for example, after the defect list is updated, the updated defect list is additionally recorded into a new unrecorded area of the information recording medium in proper timing.

However, if a plurality of defect lists, which include a newest defect list and old defect lists, are recorded into the defect management area on the write-once-type recording medium, it is not easy to efficiently specify the newest defect list from among the plurality of defect lists.

The same problems in updating the defect list and specifying the newest defect list are true for other management information. Namely, since a plurality of management information, which include a newest management information and old management information, is recorded into a management area every time the management information is updated, it is not easy to efficiently specify the newest management information from among the plurality of new/old management information.

In order to solve the above-mentioned problems, it is therefore an object of the present invention to provide: a write-once-type recording medium which allows the efficient recording of the management information and the efficient specification of the newest management information; a recording apparatus and a recording method for the write-once-type recording medium; and a reproducing apparatus and a reproducing method for the write-once-type recording medium.

Means for Solving the Subject

The above objects of the present invention can be achieved by a write-once-type recording medium provided with: a data area to record therein record data; and a plurality of management areas in which a plurality of types of management information for managing the record data and index information for indicating newest management information can be recorded a plurality of times, each of the plurality of management areas having a setup area for recording therein a management information block including a plurality of types of management information constructed from the newest management information and the index information indicating the plurality of types of management information constructed from the newest management information.

The above objects of the present invention can be also achieved by a recording apparatus for recording record data onto a write-once-type recording medium provided with: (i) a data area to record therein the record data; and (ii) a plurality of management areas in which a plurality of types of management information for managing the record data and index information for indicating newest management information can be recorded a plurality of times, the recording apparatus provided with: a first recording device for recording the record data into the data area; an updating device for updating the index information and at least one of the plurality of types of management information; a detecting device for detecting whether or not the updated index information is to be in a condition such as indicating management information recorded in a different management area; a second recording device for recording the index information and the at least one of the plurality of types of management information which are updated, into an in-use management area, if the updated index information is not to be in the condition such as indicating management information recorded in a different management area; and a third recording device for recording a management information block including a plurality of types of management information constructed from newest management information and the index information, into an unused management area, if the updated index information is to be in the condition such as indicating management information recorded in a different management area.

The above objects of the present invention can be also achieved by a computer program of instructions for tangibly embodying a program of instructions executable by a computer to make the computer function as the above-mentioned recording apparatus of the present invention (including its various aspects).

The above objects of the present invention can be also achieved by a recording method of recording record data onto a write-once-type recording medium provided with: (i) a data area to record therein the record data; and (ii) a plurality of management areas in which a plurality of types of management information for managing the record data and index information for indicating newest management information can be recorded a plurality of times, the recording method provided with: a first recording process of recording the record data into the data area; an updating process of updating the index information and at least one of the plurality of types of management information; a detecting process of detecting whether or not the updated index information is to be in a condition such as indicating management information recorded in a different management area; a second recording process of recording the index information and the at least one of the plurality of types of management information which are updated, into an in-use management area, if the updated index information is not to be in the condition such as indicating management information recorded in a different management area; and a third recording process of recording a management information block including a plurality of types of management information constructed from newest management information and the index information, into an unused management area, if the updated index information is to be in the condition such as indicating management information recorded in a different management area.

The above objects of the present invention can be also achieved by a computer program product in a computer-readable medium for tangibly embodying a program of instructions executable by a computer to make the computer function as the above-described recording apparatus of the present invention (including its various aspects).

According to the computer program product of the present invention, the recording apparatus of the present invention described above can be embodied relatively readily, by loading the computer program product from a recording medium for storing the computer program product, such as a ROM, a CD-ROM, a DVD-ROM, a hard disk or the like, into the computer, or by downloading the computer program product, which may be a carrier wave, into the computer via a communication device. More specifically, the computer program product may be provided with computer readable codes (or computer readable commands) to make the computer to function as the recording apparatus s of the present invention described above.

These effects and other advantages of the present invention will be more apparent from the following embodiments and examples.

Figure 1:
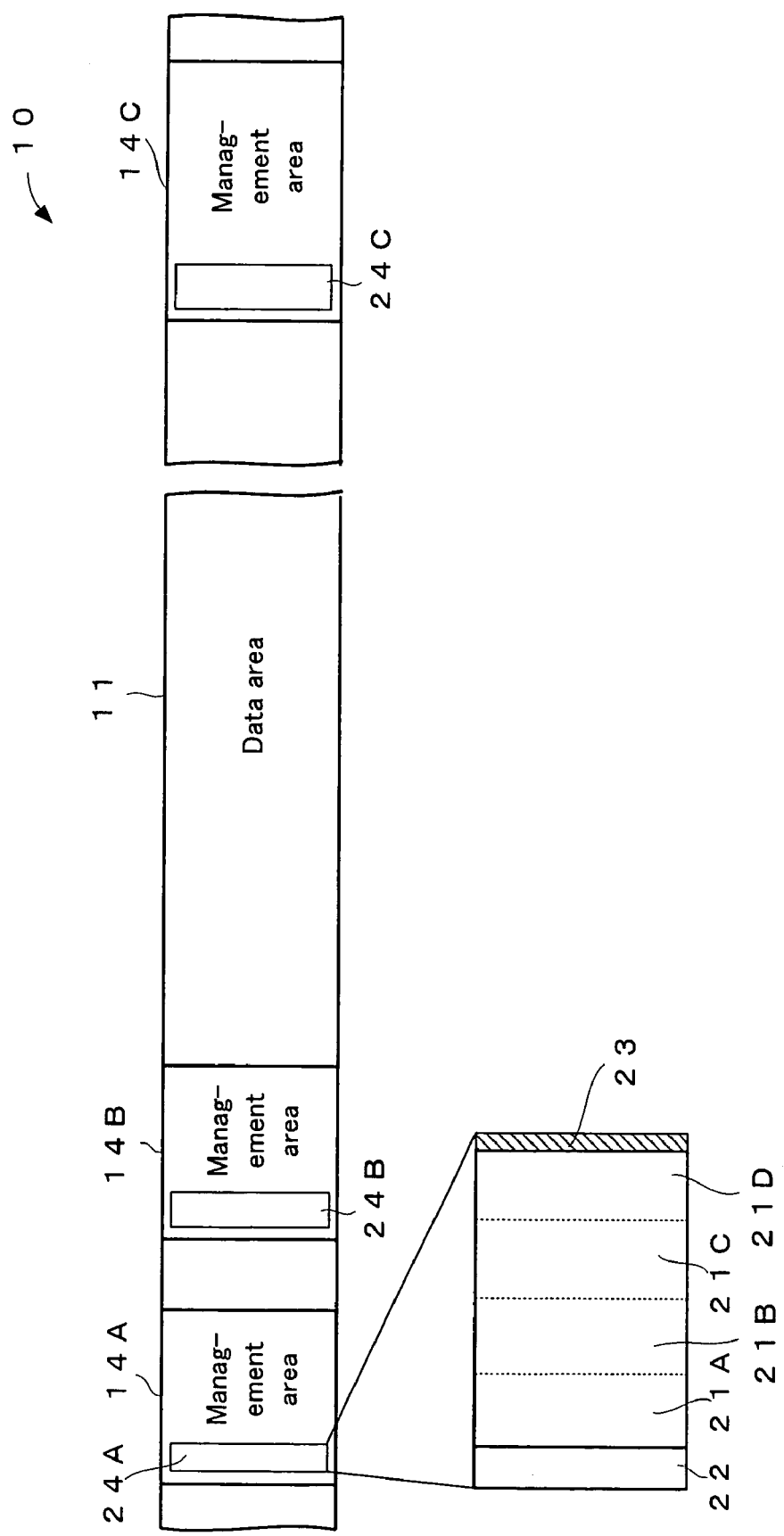
FIG. 1 is an explanatory diagram showing an embodiment of a write-once-type recording medium of the present invention.

DESCRIPTION OF REFERENCE CODES 10 write-once-type recording medium
11 data area
14A, 14B, 14C defect management area
21A, 21B, 21C, 21D management information
23 index information
24A, 24B, 24C setup area
50, 60 recording apparatus
70 reproducing apparatus
100, 120 write-once-type optical disc
200 recording/reproducing apparatus

BEST MODE FOR CARRYING OUT THE INVENTION

Hereinafter, the best mode for carrying out the invention will be explained in each embodiment in order with reference to the drawings.

Embodiment of Write-Once-Type Recording Medium

An embodiment of the write-once-type recording medium of the present invention will be explained with reference to the drawings. Incidentally, the drawings used for the explanation of embodiments of the present invention embody the constituent elements or the like of the recording medium, the recording apparatus and the reproducing apparatus of the present invention for the purpose of explaining technical ideas thereof. The shape, size, position, connection relationship and the like of each constituent element or the like are not limited to the drawings.

FIG. 1 shows the recording structure of a write-once-type recording medium in the embodiment of the present invention. A write-once-type recording medium 10 shown in FIG. 1 is a disc-shaped recording medium. The left side of FIG. 1 is the inner circumferential side of the write-once-type recording medium 10, and the right side is the outer circumferential side of the write-once-type recording medium 10. Incidentally, the shape of the write-once-type recording medium of the present invention is not limited to a disc-shape. The present invention can be applied to recording media in other shapes, such as a card-shaped recording medium. Moreover, there is no limitation on the recording method of the write-once-type recording medium of the present invention. The present invention can be applied to a recording medium which uses, for example, light, magnetism, magneto-optics, a phase change, the polarization direction of a dielectric substance, near-field light, or the like.

The recording medium 10 is a write-once-type recording medium in which the recording of data or information can be only once at each position.

As shown in FIG. 1, the recording medium 10 is provided with: a data area 11; and management areas 14A, 14B, and 14C.

The data area 11 is intended to record therein the record data. The record data is data which is mainly a target of the reproduction or execution, including, e.g., image data; audio data; text data; contents data; a computer program; or the like.

The management areas 14A, 14B and 14C are intended to record therein at least a plurality of types of management information 21A to 21D and index information 23. There are three management areas 14A, 14B and 14C on the recording surface of the recording medium 10. The management areas 14A, 14B and 14C are dispersed and located on the recording surface. Incidentally, there is no limitation on the number of the management areas. Moreover, there is no limitation on the arrangement or location of the management areas, either.

The management information is information used for management of the record data which is recorded on the recording medium 10. As specific examples of the management information, there are listed defect management information 21A used for defect management (hereinafter refereed to as the "management information 21A", as occasion demands), base bitmap information 21B indicating distribution of the record data which is recorded onto the recording medium 10 (hereinafter referred to as the "management information 21B", as occasion demands), sequential recording management information 21C indicating a sequential distribution condition of the record data (e.g. whether the record data is recorded or unrecorded) on a recording track disposed on the recording medium 10 (hereinafter referred to as the "management information 21C", as occasion demands), and other various management information 21D (hereinafter referred to as the "management information 21D", as occasion demands).

Now, the defect management, as one specific example of the data management, will be explained in more detail. The defect management is as follows; namely, when there is a defect such as scratches, dusts and deterioration in or on the recording medium 10, the record data is recorded away from the position of the defect. At the same time, the data to be recorded or already recorded at the position of the defect is alternatively recorded into a not-illustrated spare area. Moreover, the following processing is performed as a part of the defect management: recognizing the position of a defect upon reproducing the record data recorded on the recording medium 10; and reading the record data to be originally recorded or already recorded at the position of the defect, from the not-illustrated spare area.

The defect management information 21A includes a defect list. On the defect list, there are recorded: information indicating the position of a defect in the data area 11 (hereinafter referred to as "defect position information"); and information indicating a position in the spare area where the record data to be recorded or already recorded at the position of the defect is recorded (hereinafter referred to as "spare recording position information"). For example, the defect position information is address information indicating a defect position, and the spare recording position information is address information indicating a recording position in the spare area. By referring to the defect list, it is possible to recognize the position of a defect, and it is possible to read the record data to be originally recorded or already recorded at the position of the defect, from the spare area.

The defect list may be divided into a plurality of partial defect lists. Moreover, in this case, the spare area may be also divided into a plurality of partial spare areas. The index information 23 is information for specifying the management information minimally required to construct the newest management information. The "newest management information" herein is a concept indicating all of newest management information of each type of the management information, out of the management information updated as occasion demand. For example, information including the management information 21A recorded last time, the management information 21B recorded last time, the management information 21C recorded last time and the management information 21D recorded last time indicates the newest management information.

The index information 23 is desirably recorded following the management information located at the end, out of the plurality of management information 21A to 21D recorded in a continuous line in one management area. By this, it is possible to efficiently read the newest management information. For example, in FIG. 1, the management information 21A, 21B, 21C and 21D are recorded in a continuous line in the management area 14A, and the management information 21D is located at the end. In this case, the index information 23 is desirably recorded following the management information 21D. Hereinafter, the management information recorded at the end in each management area is referred to as "last management information".

With regard to the content of the index information 23, it may be any information as long as it can specify the management information minimally required to construct the newest management information. For example, if an identifier is appended to each of the management information, information indicating the content of identifiers appended to the management information minimally required to construct the newest management information may be used as the index information 23.

Each management area may include information other than the management information 21A to 21D and the index information 23. In the embodiment, definition information 22 is recorded in each management area. The definition information 22 is information about the arrangement or size of the data area or the like, for example. Moreover, in the embodiment, the index information 23 shall include information for specifying the definition information 22 as well.

Then, a management information block is constructed, including the newest management information 21 and the index information 23. Of course, the definition information 22 may be included to construct the management information block.

The defect management areas 14A, 14B and 14C are provided with setup areas 24A, 24B and 24C, respectively, to record all of the management information 21A, 21B, 21C and 21D minimally required to construct the newest management information and the index information 23 indicating the newest management information (i.e. the management information block). The setup areas 24A, 24B and 24C are desirably located at the head portions or near the head portions of the management areas 14A, 14B and 14C, respectively. The "head" herein is preferably a head on the basis of a direction of recording the record data. Moreover, the expression "near the head portion" herein means an area considered as or identified with the head portion of each management area. More specifically, if the management information 21A to 21D minimally required to construct the newest management information is recorded into the area, "near the head portion" means an area in which the efficiency of the processing of reading the management information is improved as much as the case where the management information 21A to 21D are recorded at the head portions. This allows sequential use of the management area, and improves the efficiency of the processing of reading each of the management information 21A to 21D (or the newest management information). However, there is no limitation on the arrangement or the location of the setup areas 24A, 24B and 24C. Moreover, in each management area, the arrangement or the location of the setup areas is not necessarily determined in advance, and may be determined depending on the convenience of the recording processing. Moreover, in each management area, the setup areas may be separately arranged such that each of the setup areas correspond to each of the management information 21A to 21D minimally required to construct the newest management information, respectively. Incidentally, the functions of the setup areas 24A, 24B and 24C will be apparent from the following explanation using FIG. 6 and FIG. 7.

The write-once-type recording medium 10 has a dividing and recording function for the management information and a setup function for the management information.

Firstly, the dividing and recording function for the management information will be explained. The dividing and recording function for the management information is a function of recording each of the management information 21A to 21D, with them divided in one management area (i.e. recording each of the management information individually). Namely, it is a function of recording only the management information to be updated, out of the management information 21A to 21D, into the management area. It is unnecessary to record all of the management information 21A to 21D into the management area. FIG. 2 to FIG. 5 show a state in which the management information is divided and recorded in accordance with the dividing and recording function for the management information.

Firstly, if the unrecorded recording medium 10 is loaded to the recording apparatus by a user and an instruction indicating that the recording medium 10 is to be initialized (or formatted) is inputted by the user, the recording medium 10 is initialized or formatted by the recording apparatus. At this time, a plurality of management information is generated. Specifically, the management information 21A, 21B, 21C and 21D and the definition information 22 are generated. Moreover, the index information 23 is generated which is recorded following the management information 21D.

Figure 2:
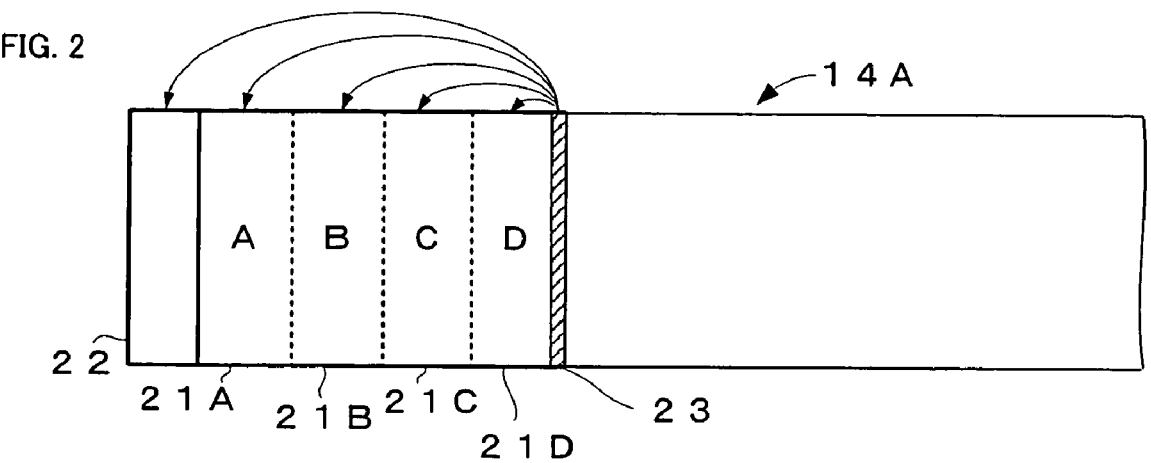
FIG. 2 is an explanatory diagram showing a dividing and recording function for management information in the embodiment of the write-once-type recording medium.

Then, as shown in FIG. 2, the generated management information 21A to 21D is recorded by the recording apparatus, at the head of the management area 14A of the recording medium 10. Then, the generated index information 23 is recorded, following the management information 21D which is the last management information. Incidentally, there is no limitation on the order of the management areas 14A, 14B and 14C used for the recording of the management information 21A to 21D. In the embodiment, the following method is adopted; the management information 21A to 21D are firstly recorded into the management area 14A from its head, secondly recorded into the management area 14B from its head when the management area 14A is filled up, and thirdly recorded into the management area 14C from its head when the management area 14B is filled up.

Then, if an instruction indicating the first recording of the record data is performed with respect to the recording medium 10 loaded to the recording apparatus is inputted by the user, the first recording of the record data is started with respect to the recording medium 10. Along with the recording of the record data, verifying or the like is performed. As a result of the verifying, if the incomplete recording of the record data (i.e. the occurrence of a defect) is recognized, the record data is recorded into the spare area.

When the record data is recorded into the spare area, the defect position information indicating the defect position at this time and the spare recording position information are obtained, and they are recorded into the management information 21A (i.e. the defect management information 21A) stored in a memory of the recording apparatus. By this, the management information 21A is updated.

After a series of the recording of the record data is completed, the index information 23, which is recorded following the updated management information 21A stored in the memory of the recording apparatus, is generated. The index information 23 is information for specifying the management information 21A to 21D minimally required to construct the newest management information, and information for specifying the definition information 22.

Figure 3:
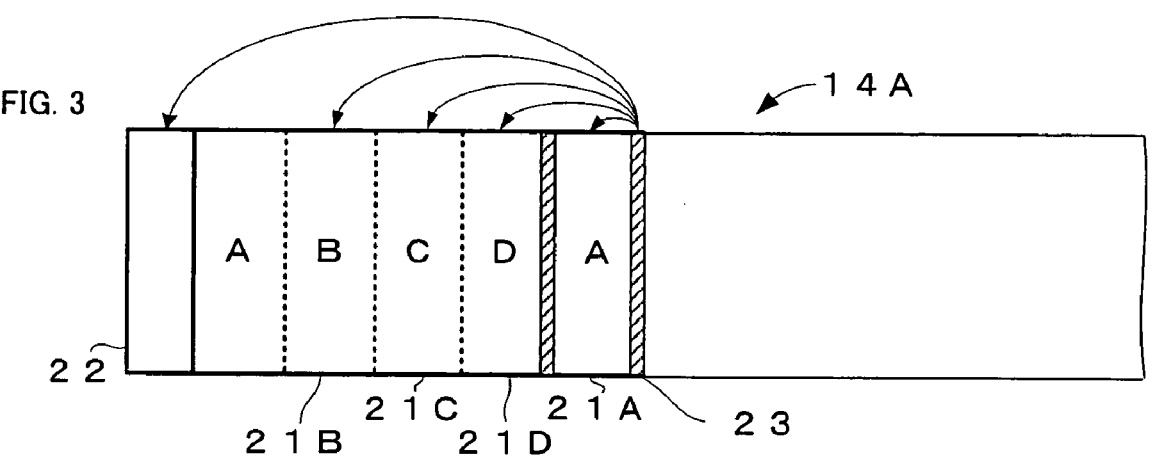
FIG. 3 is an explanatory diagram showing the dividing and recording function for the management information in the embodiment of the write-once-type recording medium.

Then, as shown in FIG. 3, only the updated management information 21A is additionally recorded or written once into the management area 14A of the recording medium 10, with the index information 23. In the management area 14A, the management information 21A is continuously recorded next to the already recorded index information 23. Incidentally, at this time, the management information 21B, 21C and 21D and the definition information 22, which are stored in the memory of the recording apparatus, are not additionally recorded onto the recording medium 10.

At a later date, if the recording medium 10 is loaded again to the recording apparatus by the user in order to perform the second recording of the record data with respect to the recording medium 10, the recording apparatus performs preparation processing. In the preparation processing, the newest management information recorded in the management area 14A of the recording medium 10 is read. At the present time, the newest management information recorded on the recording medium 10 is constructed from the definition information 22, the management information 21B, 21C and 21D and the last management information 21A, which are recorded in the management area 14A, as shown in FIG. 3. Incidentally, in FIG. 3, the last management information 21A, i.e. the management information 21A located at the end in the management area 14A, is the management information 21A located on the right side of FIG. 3.

In order to read the newest management information, firstly, the index information 23 recorded following the last management information 21A is referred to. On the basis of the index information 23, the definition information 22 and each of the management information 21A, 21B, 21C and 21D which constitute the newest management information are specified. Namely, the definition information 22 and each of the management information 21A, 21B, 21C and 21D pointed by arrows in FIG. 3 are read. Then, the newest management information is constructed from the definition information 22 and the management information 21A, 21B, 21C and 21D which are read, and stored into the memory of the recording apparatus. By this, the preparation operation is completed.

Incidentally, the index information 23 may be constructed not to have information indicating the management information followed by the index information 23. Namely, in the case of FIG. 3, it may be constructed not to have information indicating the last management information 21A. Even such construction is sufficient if the management information followed by the index information 23 (e.g. the last management information 21A in FIG. 3) is judged to be the management information constituting the newest management information. Then, it is only necessary for the index information 23 in this case to have information indicating the management information required to construct the newest management information (e.g. the management information 21B, 21C and 21D) out of the management information other than the management information followed by the index information 23.

Then, if an instruction indicating that the second recording of the record data is performed with respect to the recording medium 10 is inputted by the user, the second recording of the record data is started with respect to the recording medium 10. For example, if fingerprints or the like are left on the recording surface of the recording medium 10 between the first recording and the second recording, the left fingerprints likely causes the incomplete recording of the record data. As a result of the verifying, if the incomplete recording of the record data is recognized, the record data is recorded into the spare area.

Figure 4:
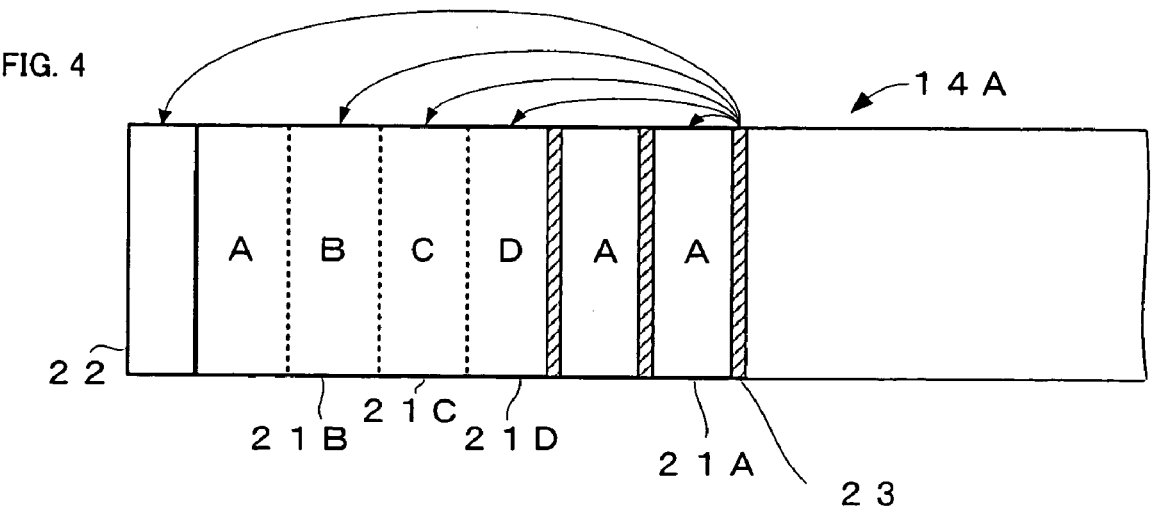
FIG. 4 is an explanatory diagram showing the dividing and recording function for the management information in the embodiment of the write-once-type recording medium.

As a result, as in the case of the first recording, the management information 21A (i.e. the defect management information 21A) is updated. Then, the index information 23 which is recorded following the updated management information 21A stored in the memory of the recording apparatus is generated. Then, as shown in FIG. 4, only the updated management information 21A is additionally recorded or written once into the management area 14A of the recording medium 10, with the index information 23.

Figure 5:
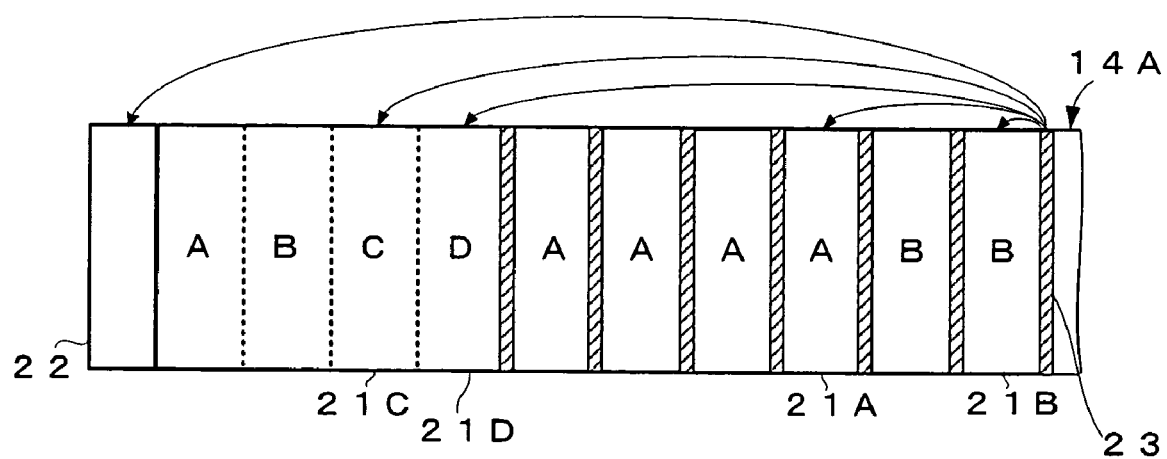
FIG. 5 is an explanatory diagram showing the dividing and recording function for the management information in the embodiment of the write-once-type recording medium.

Moreover, if the recording of the record data is performed many times with respect to the recording medium 10 and the record data is recorded into the spare area one after another due to defects newly formed on the recording medium 10, the management information 21A is also updated, along with the recording. Moreover, if the recording of the record data is performed many times with respect to the recording medium 10 and the state of distribution of the record data is changed on the recording medium 10, the management information 21B is also updated, along with the recording. As a result, as shown in FIG. 5, several management information 21A, several management information 21B and several index information 23 are additionally recorded in the management area 14A. Of course, at this time, if the other management information 21C and 21D are updated, the several of the other management information 21C and 21D are also each recorded.

In FIG. 5, the index information 23 recorded following the last management information 21B is information for specifying the other management information 21A to 21D minimally required to construct the newest management information at the present time and information for specifying the definition information 22. Specifically, it is information for specifying the definition information 22 and the management information 21C, 21D, 21A and 21B, which are pointed by the arrows in FIG. 5. Next time the recording of the record data is performed with respect to the recording medium 10, the index information 23 recorded following the last management information 21B is referred to in the preparation processing. Then, the definition information 22 and the management information 21C, 21D, 21A and 21B, which are pointed by the arrows in FIG. 5, are read. By using these, the newest management information is constructed.

As described above, according to the dividing and recording function for the management information of the write-once-type recording medium 10, since only the updated management information is additionally recorded into any one of the management areas 14A, 14B and 14C, it is possible to reduce the size of the management areas 14A, 14B and 14C. Therefore, it is possible to increase the size of the data area 11. Thus, it is possible to increase the recording capacity for the record data while increasing the reliability of the recording and reading of the record data by the defect management, or while performing proper management of the record data by using the other management information.

Moreover, by recording the index information 23 following the last management information, it is possible to quickly specify the index information 23 by a RF search or the like, for example. Namely, the recording position of the index information 23 in each management area can be easily detected by recognizing a boundary between a portion where the index information 23 is recorded and a subsequent unrecorded portion. Then, if the index information 23 recorded following the last management information can be specified, it is possible to quickly specify each of the management information 21A to 21D minimally required to construct the newest management information and the like, on the basis of the index information 23. Therefore, it is possible to easily and quickly read the newest management information.

Figure 6:
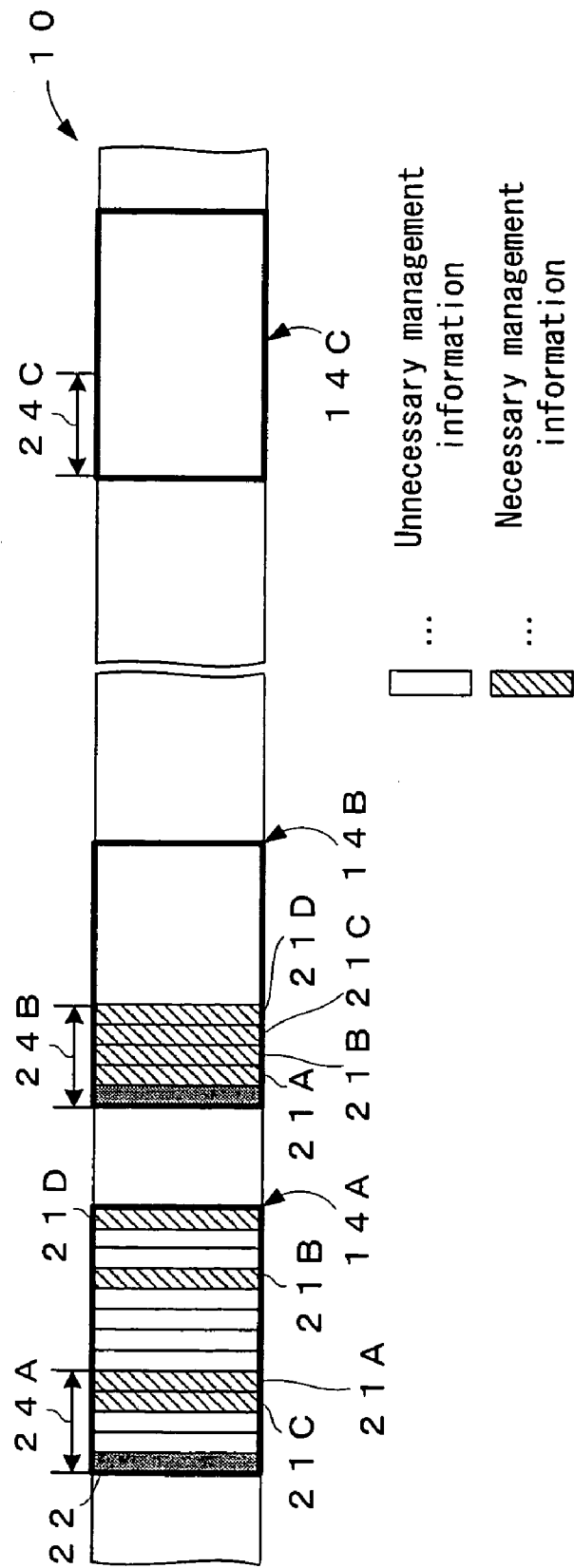
FIG. 6 is an explanatory diagram showing a setup function for the management information in the embodiment of the write-once-type recording medium.
Figure 7:
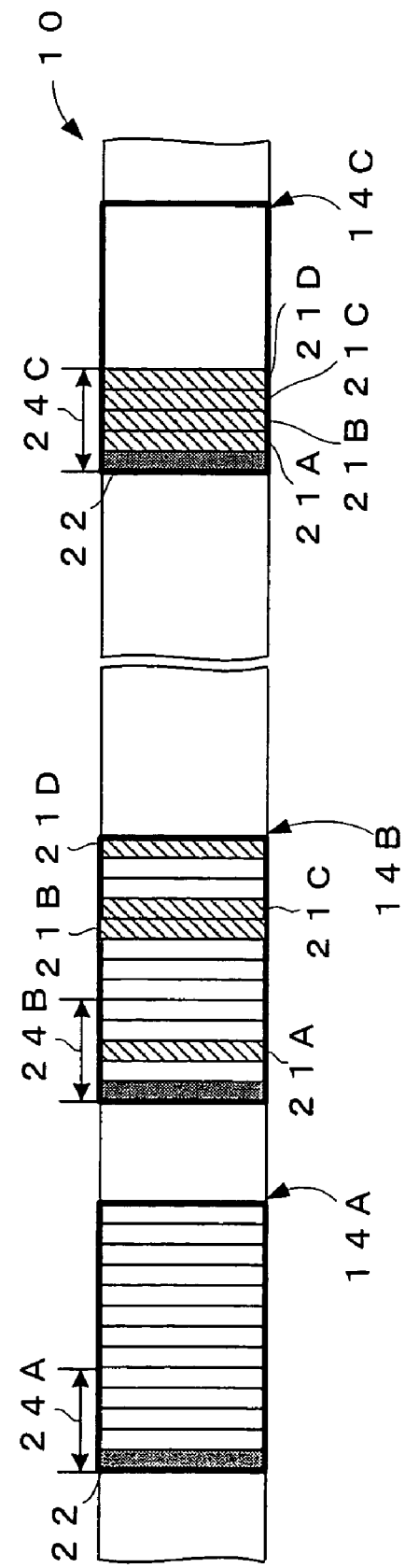
FIG. 7 is an explanatory diagram showing a setup function for the management information in the embodiment of the write-once-type recording medium.

Next, the setup function for the management information will be explained. The setup function for the management information is a function of recording all of the management information 21A, 21B, 21C and 21D minimally required to construct the newest management information and the definition information 22 (moreover, the index information 23), into the setup area of a new management area, when the management area used for the recording of the management information 21A to 21D is changed to the new management area. FIG. 6 and FIG. 7 show a state in which the management information is recorded into the management areas 14A, 14B and 14C, in accordance with the setup function for the management information.

If the recording of the record data is performed many times with respect to the recording medium 10 and each of the management information 21A to 21D is recorded one after another into the management area 14A, the management area 14A is filled up in the end. In the embodiment, if the management area 14A is filled up, the management area used for the recording of the management information is changed from the management area 14A to the management area 14B. At this time, as shown in FIG. 6, all the management information 21A, 21B, 21C and 21D minimally required to construct the newest management information and the definition information 22 (moreover, the index information 23) are recorded into a setup area 24B of the management area 14B. All of the management information 21A, 21B, 21C and 21D minimally required to construct the newest management information and the definition information 22 can be specified by the index information 23 recorded following the last management information in the management area 14A. If all of the management information 21A, 21B, 21C and 21D minimally required to construct the newest management information and the definition information 22 or the like are already stored in the memory of the recording apparatus, they are recorded into the setup area 24B of the management area 14B. If all of the management information 21A, 21B, 21C and 21D minimally required to construct the newest management information and the definition information 22 are not stored in the memory of the recording apparatus, these information are read by the recording apparatus on the basis of the index information 23, and recorded into the setup area 24B of the management area 14B.

In the same manner, if the management area 14B is filled up, all of the management information 21A, 21B, 21C and 21D minimally required to construct the newest management information at this time and the definition information 22 (moreover, the index information 23) are recorded into a setup area 24C of the next management area 14C, as shown in FIG. 7.

As described above, according to the setup function for the management information of the write-once-type recording medium 10, since all of the management information 21A, 21B, 21C and 21D minimally required to construct the newest management information and the definition information 22 (moreover, the index information 23) are recorded in one management area, it is possible to quickly read the newest management information. Namely, it is only necessary to search one management area, in order to obtain the management information 21A, 21B, 21C and 21D required to construct the newest management information and the like, and it is unnecessary to search a plurality of defect management areas. Therefore, it is possible to reduce the seek time of the pickup, which allows the quick reading.

Figure 8:
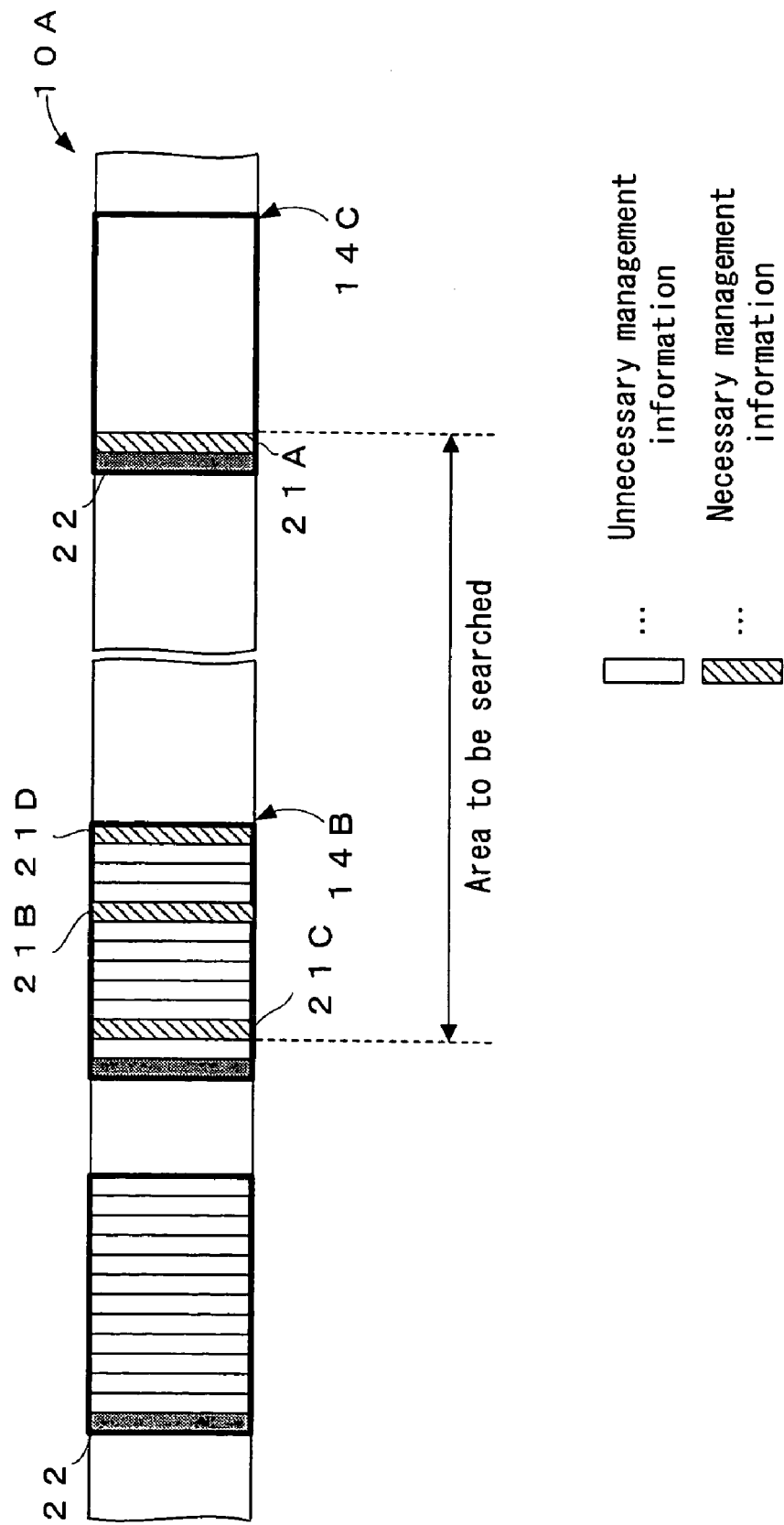
FIG. 8 is an explanatory diagram showing an aspect of recording the management information in a comparison example of the write-once-type recording medium.

If the setup area is not provided as in a write-once-type recording medium in a comparison example shown in FIG. 8, it is necessary to search a plurality of management areas in order to read the management information 21A, 21B, 21C and 21D required to construct the newest management information. Extremely speaking, it is necessary to search both the management area disposed on the inner circumferential side and the management area disposed on the outer circumferential side, which increases the seek time of the pickup. However, by adopting the structure as in the write-once-type recording medium in the embodiment, since the seek time of the pickup can be reduced, it is possible to solve the problem, and there is a great advantage that it is possible to quickly read the newest management information as a result.

Incidentally, if the number of management areas disposed on the write-once-type recording medium 10 is n (wherein n is an integer of 2 or more), at least n−1 setup areas are preferably provided. For example, in the case of the write-once-type recording medium 10 shown in FIG. 1, the above-mentioned various benefits can be received if at least two setup areas are provided for the management areas 14B and 14C, for example.

Various Aspects of Embodiment of Write-Once-Type Recording Medium

Various aspects of the embodiment of the write-once-type recording medium of the present invention will be explained. In the write-once-type recording medium of the present invention, there is no limitation on the arrangement of the management areas. However, if the arrangement of the management areas is set as follows, it is possible to provide compatibility between the write-once-type recording medium and a general rewritable-type recording medium.

Firstly, if there is a control information recording area to record therein information for controlling the recording and reading into a data area, at least one of the plurality of management areas may be disposed in the control information recording area. The control information recording area is, for example, a lead-in area or a lead-out area.

In a general rewritable-type recording medium, there is provided the control information recording area, and the management area is disposed in it. Therefore, if the management area is provided in the control information recording area of the write-once-type recording medium, it is possible to realize a common structure about the arrangement of the management area between the write-once-type recording medium and the general rewritable-type recording medium. Therefore, it is possible to provide the compatibility between the write-once-type recording medium and the general rewritable-type recording medium.

In the case of the write-once-type recording medium, every time the management information is updated, it is necessary to additionally record the updated management information into the management area, and it is impossible to overwrite it as in the rewritable-type recording medium. As a result, the management area of the write-once-type recording medium becomes larger in size than that of the rewritable-type recording medium. Therefore, if all of the management areas are disposed in the control information recording area on the write-once-type recording medium, it is necessary to expand the control information recording area. Expanding the control information recording area makes it difficult or impossible to provide the compatibility between the write-once-type recording medium and the general rewritable-type recording medium. Thus, it is preferable to provide a plurality of management areas, and dispose one or two of them into the control information recording area.

Moreover, at least one of the plurality of management areas may be disposed between the control information recording area and the data area.

As described above, if all of the management areas are disposed in the control information recording area, it is necessary to expand the control information recording area, which makes it difficult or impossible to provide the compatibility between the write-once-type recording medium and the general rewritable-type recording medium. On the other hand, it is not preferable to dispose the defect management area in the data area. This is because if the management information, which is a different type of information from the record data, is mixed in a place where the record data is to be recorded, the management for the information becomes complicated. Thus, if the management area is disposed between the control information recording area and the data area, it is possible to dissolve the inconvenience. For example, it is desirable to provide a plurality of management areas, dispose one or two of them into the control information recording area, and the record the rest of the management area between the control information recording area and the data area.

Embodiment of Recording Apparatus

Figure 9:
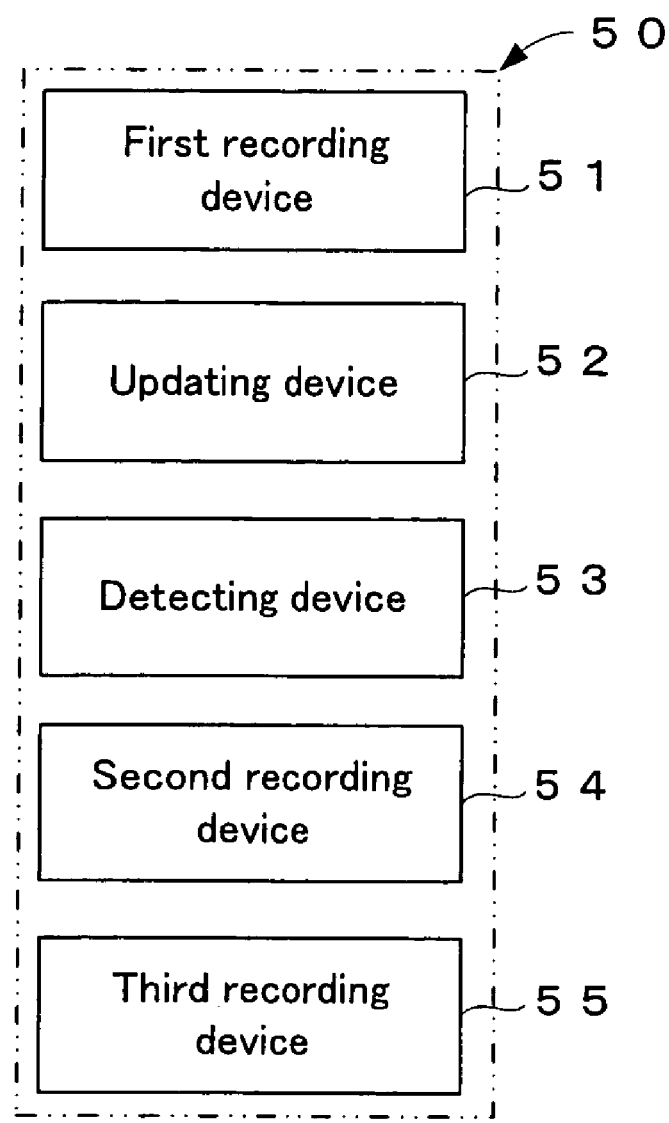
FIG. 9 is a block diagram showing an embodiment of a recording apparatus of the present invention.

An embodiment of the recording apparatus of the present invention will be explained. FIG. 9 shows the embodiment of the recording apparatus of the present invention. A recording apparatus 50 shown in FIG. 9 is a recording apparatus for recording record data onto a write-once-type recording medium on which the record data can be recorded only once and which is provided with: (i) a data area to record therein the record data; and (ii) a plurality of management areas to record therein both a plurality of management information for managing the record data and index information for indicating the newest management information out of the plurality of management information. For example, the recording apparatus 50 is a preferable apparatus for recording the record data onto the above-described write-once-type recording medium 10.

As shown in FIG. 9, the recording apparatus 50 is provided with: a first recording device 51; an updating device 52; a detecting device 53; a second recording device 54; and a third recording device 55.

The first recording device 51 is a device for recording the record data into the data area. If the recording medium is an optical disc, the first recording device 51 can be realized by an optical pickup, a controller for controlling the optical pickup and the like. Incidentally, the specific hardware structure of the first recording device can be selected depending on a recording method (light, magnetism, magneto-optics, phase-change, polarization direction of a dielectric substance, near-field light or the like) adopted by the recording medium, as occasion demands. For example, it may be a magnetic head or a probe.

The updating device 52 is a device for updating at least one of the plurality of management information. For example, it is a device for updating the defect management information, by recording information (e.g. address information) indicating the position of the detected defect and a position in the spare area where the record data to be recorded at the position of the defect is recorded onto the defect list. The other management information (e.g. space bitmap information, sequential recording management information, etc.) can be also updated in the same manner.

The detecting device 53 is a device for detecting whether or not there is a space area necessary to record the index information and at least one of the management information which are updated by the updating device, into one of the plurality of management areas (specifically, one management area which is in use to record the management information at the present time).

The second recording device 54 is a device for recording the management information which is updated by the updating device 52, into one of the plurality of management areas. In particular, it is a device for recording at least one management information which is updated, into one management area, if the detecting device 53 detects that there is a space area.

The third recording device 55 is a device for recording the newest management information and the index information indicating the newest management information (specifically, each of the management information minimally required to construct the newest management information out of the plurality of management information), into another management area out of the plurality of management areas. In particular, it is a device for recording the index information and the newest management information including at least one management information which are updated, into another management area different from the one management area (specifically, another management area which is used next to the one management area), if the detecting device 53 detects that there is not any space area.

Incidentally, it is possible to individually provide a plurality of sets of hardware, which constitute the first to third recording devices 51, 54, and 55, but usually, one set is enough. For example, it is enough to provide one optical pickup and one controller, and three software for controlling the controller, correspondingly to the respective recording devices.

Hereinafter, the operation of the recording apparatus 50 will be explained. In recording the record data onto the write-once-type recording medium, the recording medium is loaded into the recording apparatus 50 by the user. If the management information is recorded in the management area on the recording medium, the recording apparatus 50 reads this information. At this time, the read management information may be held in a memory or the like. Moreover, if the recording medium is not initialized nor formatted, the recording apparatus 50 initializes or formats the recording medium, and generates the management information at that time. The recording apparatus 50 records the generated management information into the management area on the recording medium. Even at this time, the generated management information may be held into a memory or the like.

Then, the first recording device 51 records the record data into the data area on the recording medium. The record data is verified upon the recording thereof. The updating device 52 updates at least one of the plurality of management information, if necessary. For example, if a defect is detected on the recording medium, the updating device 52 generates the information indicating the position of the defect and the information indicating a position in the spare area where the record data to be recorded at the position of the defect is recorded, to thereby update the management information (specifically, the above-mentioned defect management information 21A). Alternatively, if the recording of the record data is performed many times with respect to the recording medium and the state of distribution of the record data is changed on the recording medium, the management information (specifically, the above-mentioned space bitmap information 21B) is also updated, along with the recording. The other management information is also updated, as occasion demands, if necessary, in the same manner.

Here, the recording of the record data is performed many times with respect to the recording medium, the management information is recorded into one management area one after another, and eventually the management area is filled up. If so, it is necessary to change the management area used for recording the management information. In order to judge whether or not to change the management area, the detecting device 53 detects whether or not there is a space area to record therein the index information and at least one management information which are updated by the updating device 52, in one management area, when the recording of the record data by the first recording device 51 is ended or in similar cases. In other words, it is detected whether or not the management information block, including the newest management information and the index information indicating the newest management information (moreover, the above-mentioned definition information), is recorded over two or more management areas by recording at least one management information.

If it is judged that there is a space area (i.e. the management information block is not recorded over two or more management areas) on the basis of the detection result by the detecting device 53, the second recording device 54 records at least one management information which is updated by the updating device 52, into one management area.

On the other hand, if it is judged that there is not a space area (i.e. the management information block is recorded over two or more management areas), the third recording device 55 records the management information block, including all of the management information minimally required to construct the newest management information and the index information indicating the newest management information, into a next new management area (i.e. another management area).

As described above, according to the recording apparatus 50, since it is constructed to select only the updated management information and to record this into the management area, it is possible to reduce the amount of information recorded in the management area. Because of this, it is no longer necessary to provide the large management area for the recording medium, and as described above, it is possible to increase the recording capacity for the record data.

Moreover, it is constructed to record all of the management information minimally required to construct the newest management information, into the management area which will be used next, in changing the defect management area used for recording the defect management information. Thus, in one management area which is in use, there are always recorded all of the management information minimally required to construct the newest management information. In other words, it is possible to avoid the situation that the newest management information is recorded over the plurality of management areas. Therefore, by searching only the one in use management area, it is possible to read the management information minimally required to construct the newest management information. Thus, it is possible to quickly obtain the newest management information.

Various Aspects of Embodiment of Recording Apparatus

Figure 10:
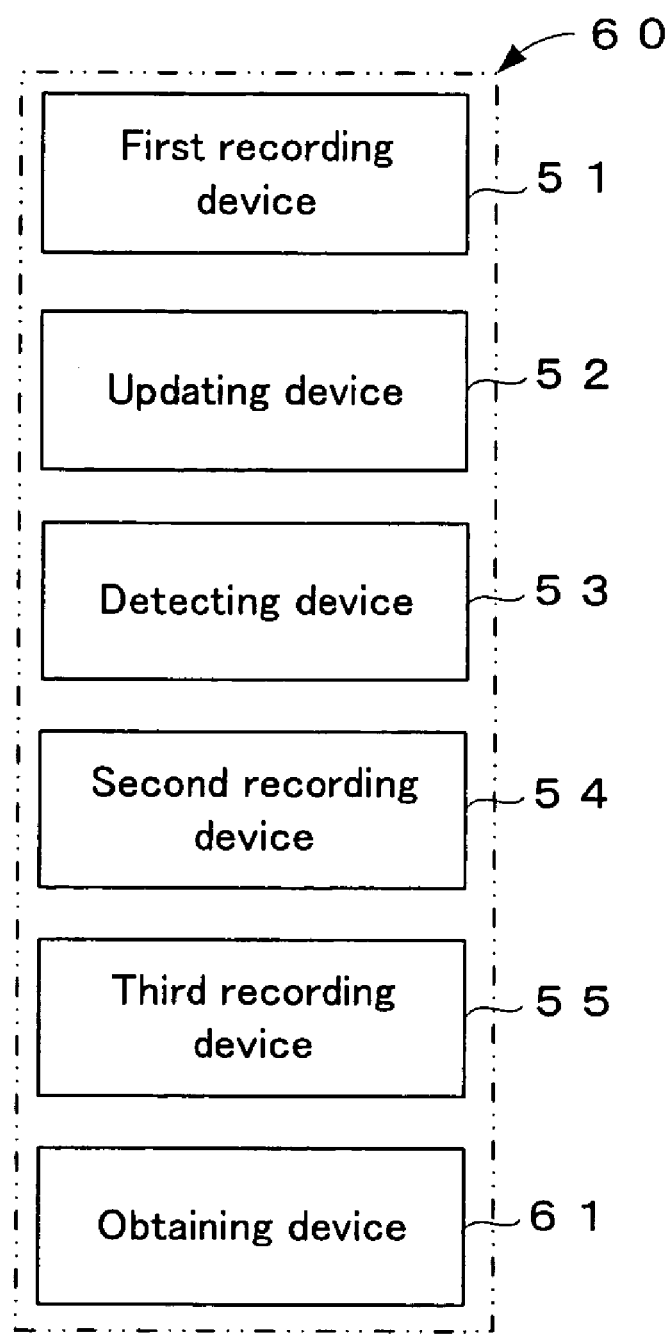
FIG. 10 is a block diagram showing a modified aspect of the embodiment of the recording apparatus of the present invention.

Various aspects of the embodiment of the recording apparatus of the present invention will be explained. FIG. 10 shows various aspects of the embodiment of the recording apparatus of the present invention.

As shown in a recording apparatus 60 in FIG. 10, it may be provided with an obtaining device 61, in addition to the constituent elements of the recording apparatus 50. The obtaining device 61 is a device for obtaining the newest management information by specifying all of the management information minimally required to construct the newest management information, on the basis of the index information, from among the plurality of management information recorded in any one of the plurality of management areas, reading the plurality of management information which are specified and combining the plurality of management information which are read.

According to the obtaining device 61, as shown in FIG. 10, for example, even if there is management information not necessary to construct the newest management information in the management area because of updating each management information many times, it is possible to surely select the management information required to construct the newest management information, and it is possible to construct the newest management information by combining the selected management information.

Embodiment of Reproducing Apparatus

Figure 11:
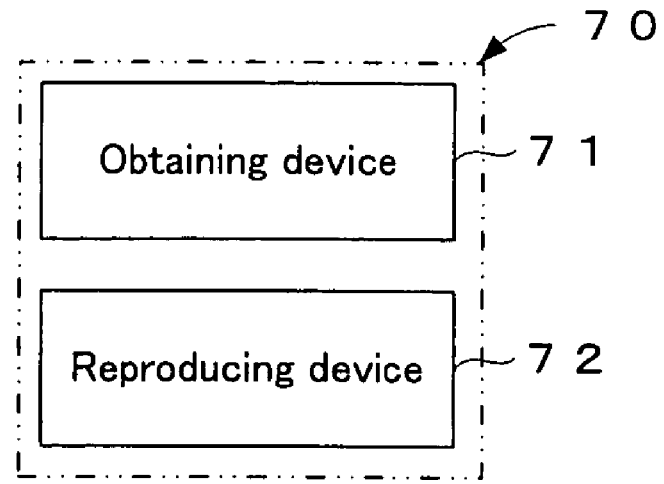
FIG. 11 is a block diagram showing an embodiment of a reproducing apparatus of the present invention.

An embodiment of the reproducing apparatus of the present invention will be explained. FIG. 11 shows the embodiment of the reproducing apparatus of the present invention. A reproducing apparatus 70 shown in FIG. 11 is an apparatus for reproducing record data recorded on a write-once-type recording medium on which the record data can be recorded only once and which is provided with: (i) a data area to record therein the record data; and (ii) a plurality of management areas to record therein both a plurality of management information for managing the record data and index information for indicating the newest management information out of the plurality of management information. For example, the reproducing apparatus 70 is an apparatus for reproducing the record data recorded on the above-described write-once-type recording medium 10.

As shown in FIG. 11, the reproducing apparatus 70 is provided with: an obtaining device 71; and a reproducing device 72.

The obtaining device 71 is a device for specifying all of the management information minimally required to construct the newest management information, from among the plurality of management information (i.e. the above-mentioned plurality of management information 21A to 21D) recorded in any one of the plurality of management areas, on the basis of the index information, reading the plurality of management information which are specified and combining the plurality of management information which are read, to thereby construct the newest management information. The obtaining device 71 is substantially the same as the above-described obtaining device 61 of the recording apparatus 60.

The reproducing device 72 is a device for reproducing the record data recorded in the data area, on the basis of the newest management information constructed by the obtaining device 71. If the record data is image data, for example, the reproducing device 72 is provided with a decoder for converting the image data to an image signal which can be reproduced on a display, or the like.

As described above, according to the reproducing apparatus 70, it can read all of the management information minimally required to construct the newest management information, from among the plurality of management information recorded in the management area on the recording medium and use the read management information, to thereby construct the newest management information. Then, it can reproduce the record data while performing various data management, such as the defect management, for example, on the basis of the newest management information. Therefore, it is possible to improve the reliability of the reproduction of the record data.

Incidentally, the embodiment described above may be realized in an integral form with hardware, as an exclusive apparatus, or may be realized by making a computer read a program.

Embodiment of Recording Method

An embodiment of the recording method of the present invention will be explained. The recording method is a method of recording record data onto a write-once-type recording medium on which the record data can be recorded only once and which is provided with: (i) a data area to record therein the record data; and (ii) a plurality of management areas to record therein both a plurality of management information for managing the record data and index information for indicating the newest management information out of the plurality of management information.

This recording method is provided with: a first recording process of recording the record data into the data area; an updating process of updating at least one of the plurality of management information; a detecting process of detecting whether or not there is a space area necessary to record the at least one management information which is updated, in one of the plurality of management areas; a second recording process of recording the at least one management information which is updated, into the one of the plurality of management areas, if there is a space area on the basis of a detection result in the detecting process; and a third recording process of recording a management information block into another one of the plurality of management areas, if there is not a space area on the basis of the detection result in the detecting process.

According to the recording method, since it is constructed to additionally record only the updated management information, it is possible to reduce the amount of information recorded in the management area. Because of this, it is no longer necessary to provide the large management area for the recording medium, and as described above, it is possible to increase the recording capacity for the record data.

Moreover, according to this recording method, it is constructed to record the management information block, including all of the management information minimally required to construct the newest management information and the index information indicating the newest management information, into a management area which will be used next time, if there is not any space area in the one management area. Thus, in reading the management information next, it is possible to read all of the management information minimally required to construct the newest management information by searching only the one management area, and, it is possible to quickly obtain the newest management information.

Embodiment of Reproducing Method

An embodiment of the reproducing method of the present invention will be explained. The reproducing method is a method of reproducing record data recorded on a write-once-type recording medium on which the record data can be recorded only once and which is provided with: (i) a data area to record therein the record data; and (ii) a plurality of management areas to record therein both a plurality of management information for managing the record data and index information for indicating the newest management information out of the plurality of management information.

The reproducing method is provided with: an obtaining process of specifying all of the management information minimally required to construct the newest management information, from among the plurality of management information recorded in any one of the plurality of management areas, on the basis of the index information, reading the plurality of management information which is specified and combining the plurality of management information which is read, to thereby construct the newest defect list; and a reproducing process of reproducing the record data recorded in the data area on the basis of the newest management information constructed in the obtaining process.

According to this reproducing method, it is possible to read the management information required to construct the newest management information, from among the plurality of management information recorded in the management area on the recording medium, and use the read management information, to thereby construct the newest management information. Then, it is possible to reproduce the record data while performing various data management, such as the defect management, on the basis of the newest management information. Therefore, it is possible to improve the reliability of the reproduction of the record data.

EXAMPLES

First Example of Write-Once-Type Recording Medium

Figure 12:
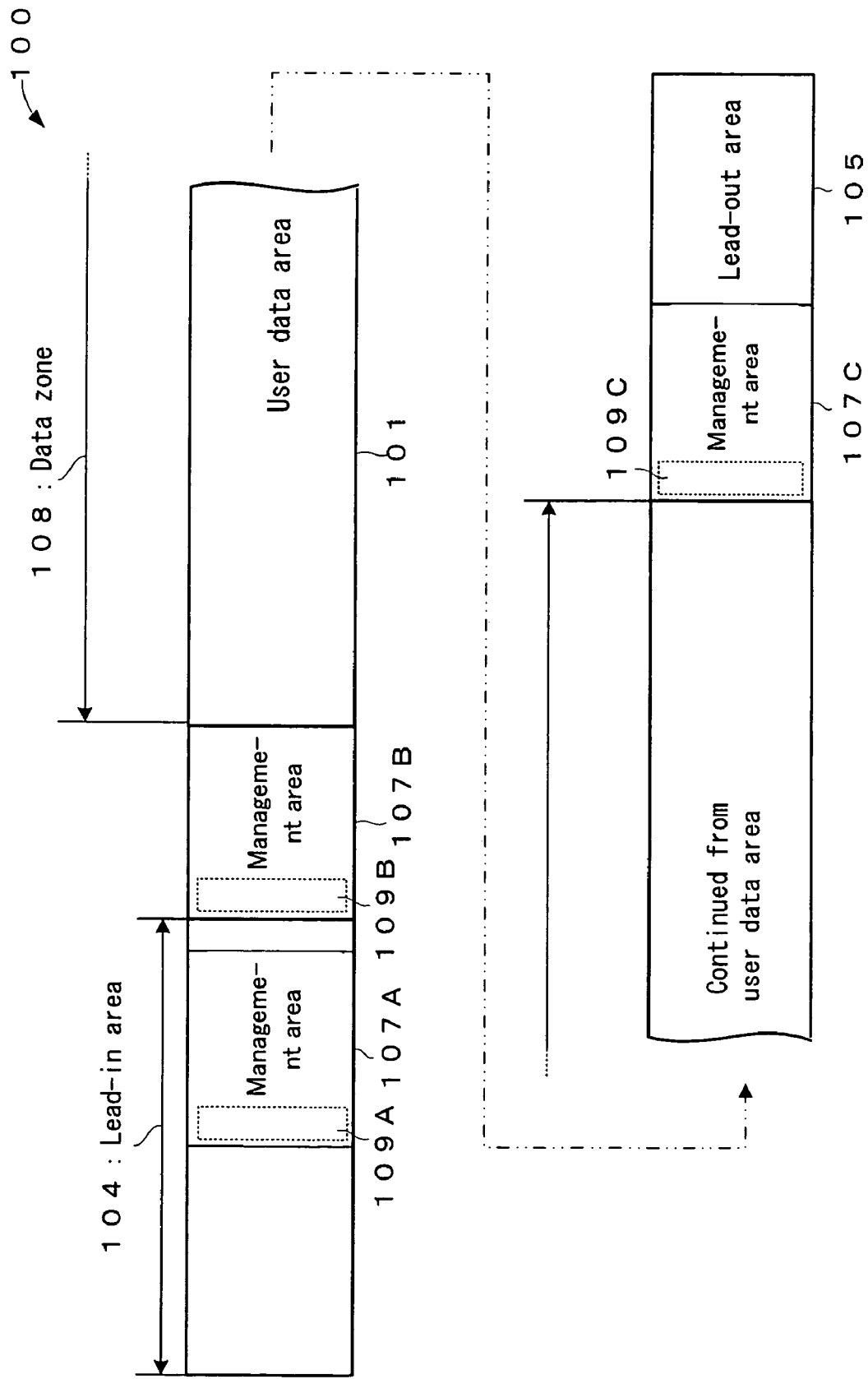
FIG. 12 is an explanatory diagram showing a first example of the write-once-type recording medium of the present invention.

The first example of the write-once-type recording medium of the present invention will be explained. In the first example, the write-once-type recording medium of the present invention is applied to a one-layer write-once-type optical disc. FIG. 12 shows the record structure of a write-once-type optical disc 100. The upper left side of FIG. 12 is the inner circumferential side of the optical disc 100, and the lower right side is the outer circumferential side of the optical disc 100.

As shown in FIG. 12, the optical disc 100 is provided with: a user data area 101; a lead-in area 104; a lead-out area 105; and management areas 107A, 107B and 107C.

The user data area 101 is a main area to record therein the record data. A data zone 108 is formed from the user data area 101.

The lead-in area 104 and the lead-out area 105 are intended to record control information therein. The lead-in area 104 is located on the innermost circumferential side of the optical disc 100. The lead-out area 105 is located on the outermost circumferential side of the optical disc 100.

The management areas 107A, 107B and 107C are intended to record therein various management information described later. There are three management areas on the optical disc 100. The first management area 107A is disposed in the lead-in area 104. The second management area 107B is disposed between the lead-in area 104 and the data zone 108. The third management area 107C is disposed between the data zone 108 and the lead-out area 105.

Setup areas 109A, 109B and 109C are prepared for the management areas 107A, 107B and 107C, respectively. If the use of the management area 107A is started to record the management information, all of the management information minimally required to construct the newest management information at this time and setting information (moreover, the index information) are recorded into the setup area 109A. If the use of the management area 107B is started to record the management information, all of the management information minimally required to construct the newest management information at this time and setting information (moreover, the index information) are recorded into the setup area 109B. If the use of the management area 107C is started to record the management information, all of the management information minimally required to construct the newest management information at this time and setting information (moreover, the index information) are recorded into the setup area 109C.

As described above, according to the optical disc 100, the management area 107B is disposed between the lead-in are 104 and the data zone 108, and the management area 107C is disposed between the data zone 108 and the lead-out area 105. By this, while providing the compatibility between the optical disc 100 and the general rewritable-type recording medium, it is possible to provide the management area having a relatively large size. Thus, it is possible to increase the number of times that the management information can be updated. Of course, even without the above-mentioned arrangement, it is possible to receive various benefits explained in the example.

Moreover, the management area is divided into the three management areas 107A, 107B and 107C, and they are distributed and disposed on the optical disc 100. By this, it is possible to provide the management areas having a relatively large size, without greatly change the existing record structure about the optical disc. By this, it is possible to increase the number of times that the management information can be updated.

Furthermore, the setup areas 109A, 109B and 109C are prepared for the management areas 107A, 107B and 107C, respectively. Then, when the use of the management areas 107A, 107B and 107C is each started, all of the management information minimally required to construct the newest management information at this time, and the setting information are recorded into the setup areas 109A, 109B and 109C, respectively. Thus, it is possible to quickly read the newest management information and the setting information from the optical disc 100.

Second Example of Write-Once-Type Recording Medium

Figure 13:
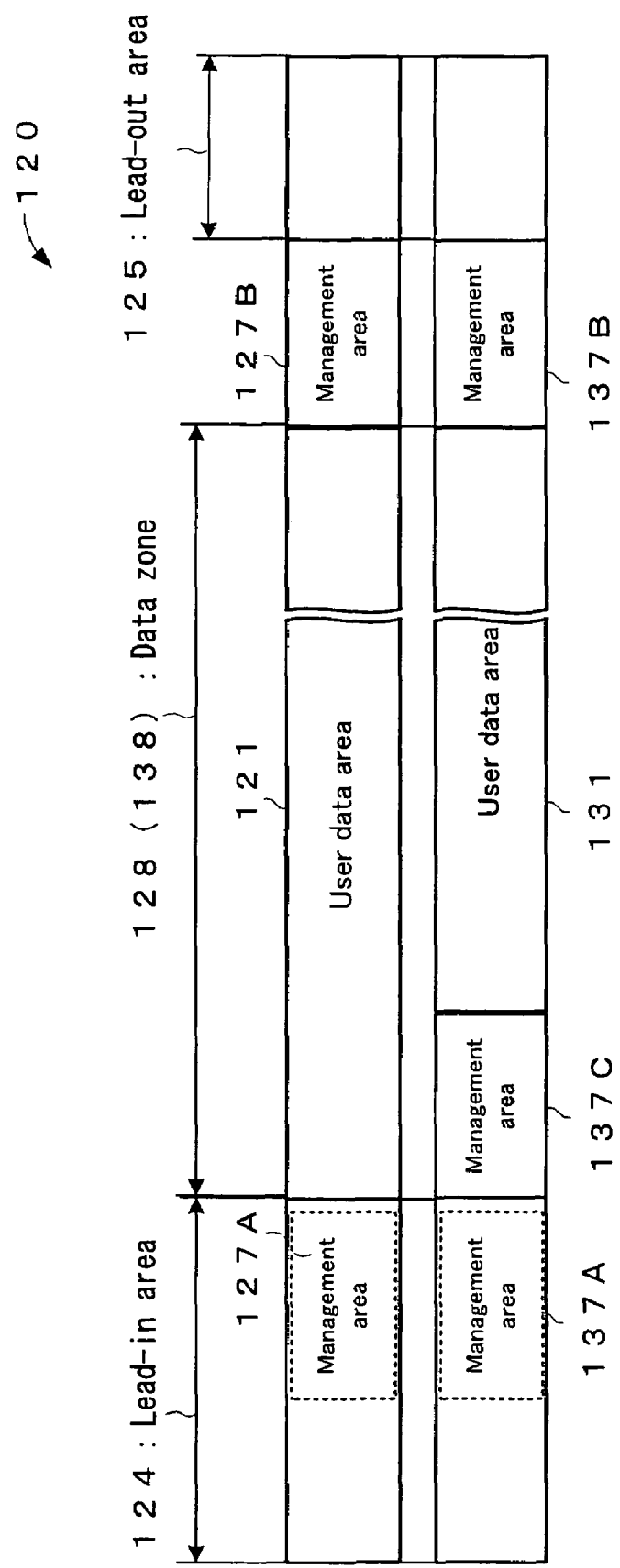
FIG. 13 is an explanatory diagram showing a second example of the write-once-type recording medium of the present invention.

The second example of the write-once-type recording medium of the present invention will be explained. In the second example, the write-once-type recording medium of the present invention is applied to a two-layer write-once-type optical disc. FIG. 13 shows the record structure of a write-once-type optical disc 120. The left side of FIG. 12 is the inner circumferential side of the optical disc 120, and the right side is the outer circumferential side of the optical disc 120.

As shown in FIG. 13, a first layer of the optical disc 120 is provided with: a user data area 121; a lead-in area 124; a lead-out area 125; and management areas 127A and 127B. A data zone 128 is formed from the user data area 121. A second layer of the optical disc 120 is provided with: a user data area 131; a lead-in area 134; a lead-out area 135; and management areas 137A, 137B, and 137C. A data zone 138 is formed from the user data area 131. Moreover, this is not illustrated but as with the optical disc 100, a setup area is prepared in each management area.

Even by virtue of the optical disc 120 having such a structure, it is possible to achieve the same operational effect as in the optical disc 100.

In particular, in the optical disc having two or more recording layers, if the newest management information is recorded over the plurality of management areas, it is necessary to change the recording layer which is a reading target (i.e. it is necessary to perform layer jump processing), in order to read the newest management information. It takes more trouble to read the newest management information than the case of the optical disc having a one-layer recording layer. Therefore, by adopting the structure as in the optical disc in the example, there is a great advantage that it is possible to quickly read the newest management information.

Example of Management Information

Figures 14, 15:
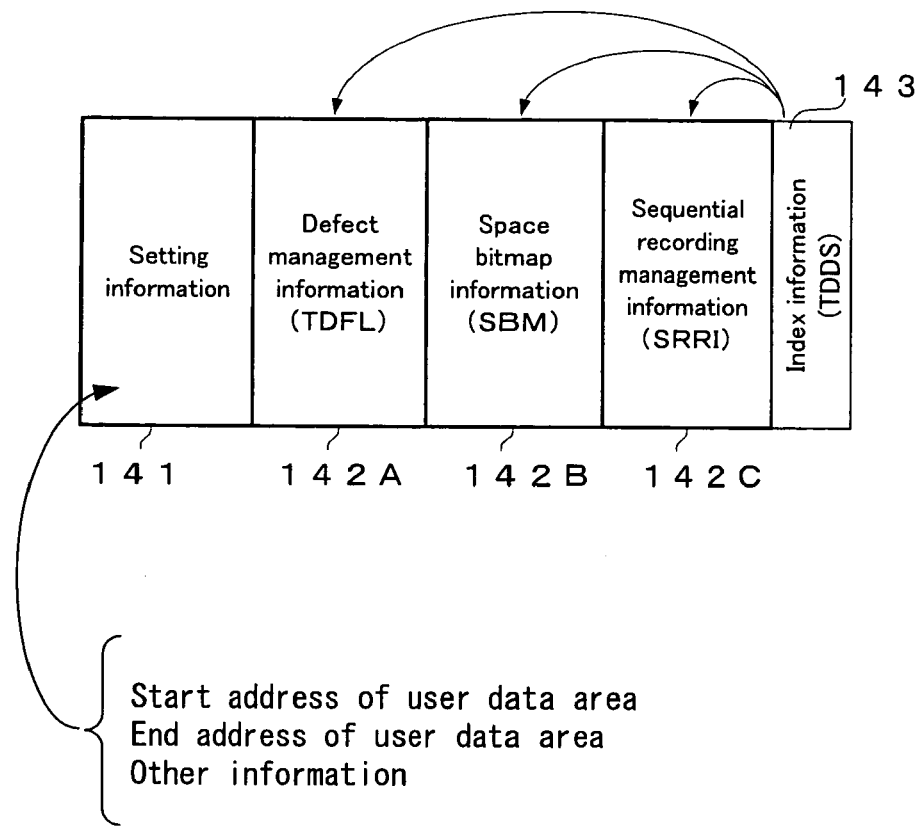
FIG. 14 is an explanatory diagram showing an example of the management information associated with the write-once-type recording medium of the present invention.
FIG. 15 is an explanatory diagram showing one example of defect management information as one specific example of the management information.

An explanation will be given for a plurality of types of management information (or the setting information and the index information indicating the newest management information among each type of management information) which is recorded in the management area of the write-once-type recording medium of the present invention. FIG. 14 shows the management information for the optical disc 100.

As shown in FIG. 14, as the information to be recorded in the management area, there are included setting information 141, a plurality of types of individual management information 142A to 142C and index information 143 (e.g. TDDS: Temporary Disc Definition Structure) indicating the newest management information. As the individual management information, specifically, there are included defect management information (TDFL: Temporary Defect List) 142A (hereinafter referred to as "management information 142A", as occasion demands), space bitmap information (SBM: Space Bit Map information) 142B (hereinafter referred to as "management information 142B", as occasion demands) and sequential recording management information (SRRI: Sequential Recording Range information) 142C (hereinafter referred to as "management information 142C", as occasion demands). Of course, other information may be included as the individual management information. The setting information 141 includes a start address of the user data area 101 and an end address of the user data area 101. Alternatively, it may include a size of the spare area used for the defect management and other information.

The position and size of the user data area 101 on the optical disc 100 are determined on the basis of the setting information 141. The setting information 141 may be generated by a recording/reproducing apparatus in initializing the optical disc 100 and recorded onto the optical disc. Therefore, the position and size of the data zone 108 can be arbitrarily set by the recording/reproducing apparatus. For example, by adjusting the start address of the user data area 101 or the like, it is possible to form an area between the lead-in area 104 and the data zone 108, and use the area as the management area 107B.

In the defect management information 142A, as shown in FIG. 15, there are recorded: an address indicating the position of a defect in the user data area 101 (which is hereinafter referred to as a "defect address"); an address indicating the recording position in the spare area of the record data to be recorded or already recorded at the position of the defect (which is hereinafter referred to as a "spare address"); and other information.

In the space bitmap information 142B, there is recorded information indicating a state of distribution of the record data on the optical disc 100.

In the sequential recording management information 142C, there is recorded information indicating a state of sequential distribution of the record data on a recording track (e.g. a groove track and a land track, etc.) disposed on the optical disc 100. Namely, the sequential recording management information 142C is mainly used to manage the recording track.

Incidentally, an identifier which specifies each of the management information 142A to 142C may be appended to each of the management information 142A to 142C, as a header, for example.

The index information 143 includes information indicating the content of the identifier of each of the management information 142A to 142C. Moreover, the index information 143 includes information for specifying the setting information 141 (e.g. an identifier, an address value, etc.). The index information 143 is recorded following the management information (the management information 142C in FIG. 14) corresponding to the last management information, out of the management information generated in initializing the optical disc 100, and after that, it is recorded even following the updated management information (refer to FIG. 3 to FIG. 5).

Figure 16:
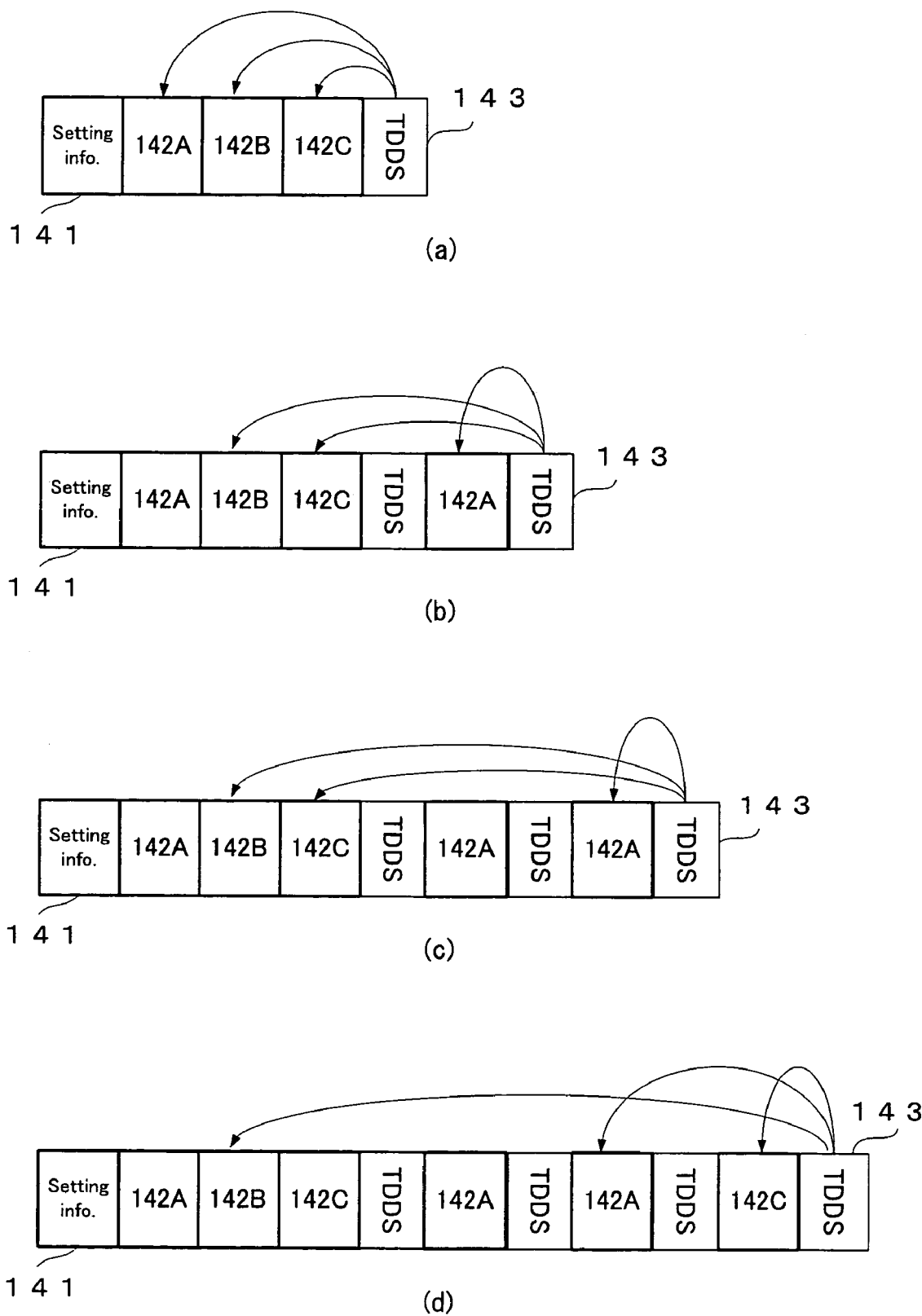
FIG. 16(a) to FIG. 16(d) are explanatory diagrams showing an aspect of updating the management information associated with the write-once-type recording medium of the present invention.

The updating of the management information will be explained, specifically with respect to FIG. 16.

As shown in FIG. 16(a), each of the management information 142A to 142C which are generated in initializing the optical disc 100, for example, the setting information 141 and the index information 143 are recorded into one management area (e.g. the management area 107A).

Then, if the management information 142A is updated due to a defect generated on the optical disc 100, the updated management information 142A and new index information (TDDS) 143 indicating the newest management information are recorded into the one management area as shown in FIG. 16(b).

Moreover, if the management information 142A is updated due to a new defect generated on the optical disc 100, the updated management information 142A and new index information (TDDS) 143 indicating the newest management information are recorded into the one management area as shown in FIG. 16(c).

Then, if the management information 142C is updated due to a change in the state of distribution of the record data on the optical disc 100, the updated management information 142C and new index information (TDDS) 143 indicating the newest management information are recorded into the one management area as shown in FIG. 16(d).

After this operation (i.e. the dividing and recording operation for the management information) is repeated, if there is no more space area to record the updated management information in the one recording area, the management information 142A to 142C minimally required to construct the newest management information, the setting information 141 and the index information 143 for specifying the management information 142A to 142C minimally required to construct the newest management information are recorded into the setup area of another management area (e.g. the management area 107B). Namely, a setup operation for the management information is performed. After that, the above-mentioned dividing and recording operation is repeated.

Incidentally, with regard to each of the management information 142A to 142C, the setting information 141 and the index information 143, if the amount of each of these information is small, a plurality of them may be recorded into one ECC cluster. Alternatively, if the amount of each of these information is large, a plurality of them may be recorded over several ECC clusters.

As described above, according to the optical disc in the example, it is possible to individually update and record the management information 142A to 142C. Namely, if only the management information 142A out of the management information is updated, it is only necessary to record the management information 142A into any one of the management areas, and it is unnecessary to record the management information 142B and 142C which are not updated, into any one of the management areas. By this, it is possible to reduce the amount of information recorded in the management areas 107A, 107B and 107C, and reduce the size of the management areas 107A, 107B and 107C.

Moreover, by recording the index information 143 following the last management information, it is possible to quickly specify and read all the individual management information 142A to 142C minimally required to construct the newest management information, on the basis of the index information 143.

Examples of Recording Apparatus Reproducing Apparatus

Figure 17:
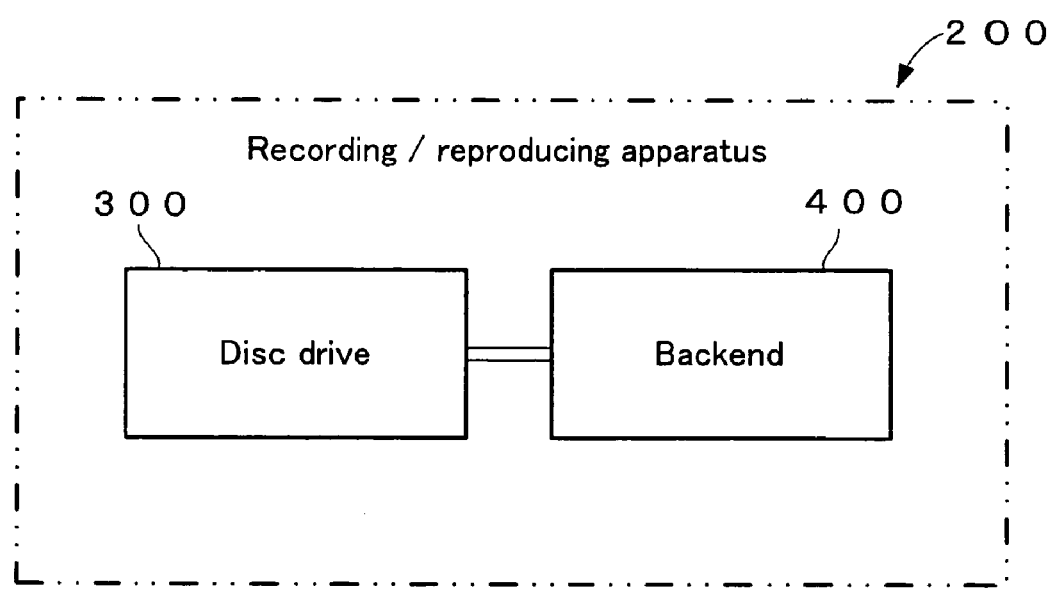
FIG. 17 is a block diagram showing a recording/reproducing apparatus, which is an example of the recording apparatus and the reproducing apparatus of the present invention.

The examples of the recording apparatus and the reproducing apparatus of the present invention will be explained. FIG. 17 shows the example of the recording and reproducing apparatuses of the present invention. A recording/reproducing apparatus 200 shown in FIG. 17 is provided with: a function as a recording apparatus for recording the record data onto the optical disc 100; and a function as a reproducing apparatus for reproducing the record data recorded on the optical disc 100.

Firstly, the structure of the recording/reproducing apparatus 200 will be explained. As shown in FIG. 17, the recording/reproducing apparatus 200 is provided with: a disc drive 300; and a backend 400.

Figure 18:
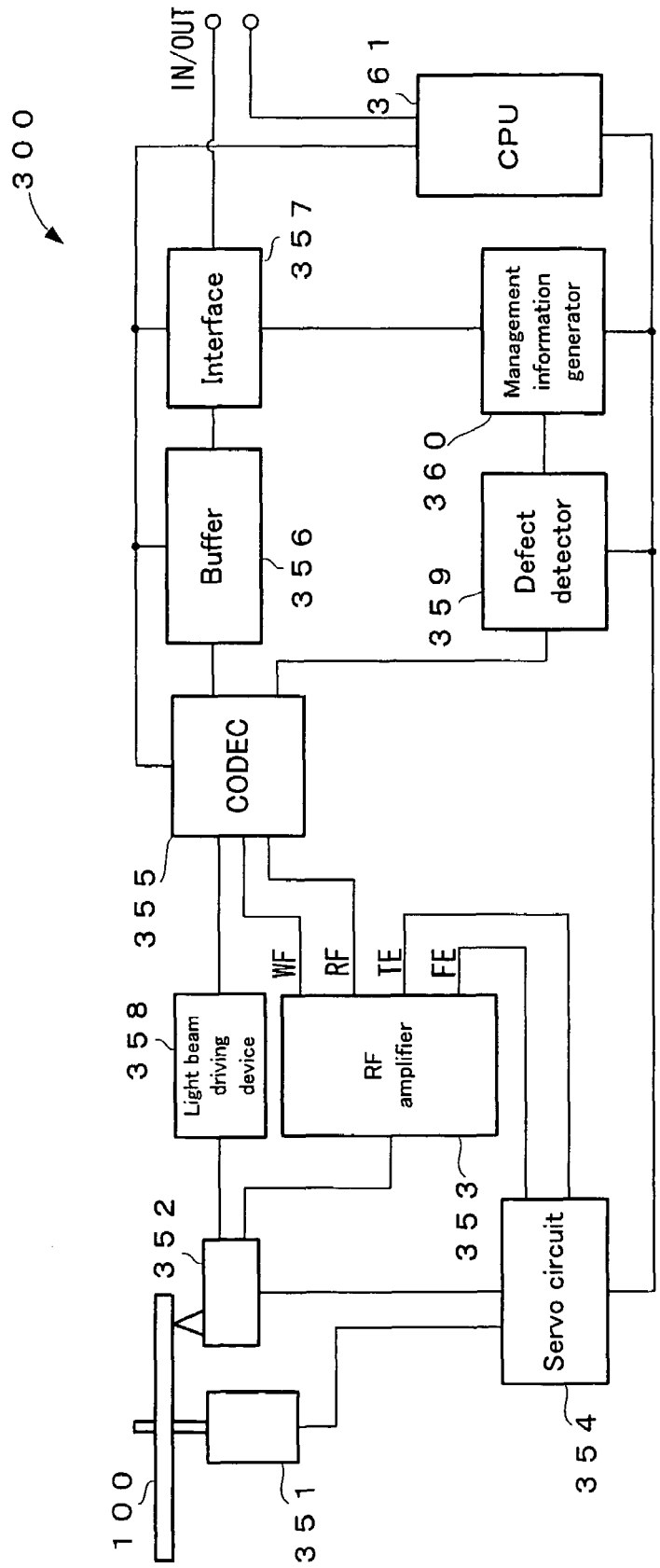
FIG. 18 is a block diagram showing a disc drive.

FIG. 18 shows the inner structure of the disc drive 300. The disc drive 300 is an apparatus for recording information onto the optical disc 100 and reading the information recorded on the optical disc 100.

As shown in FIG. 18, the disc drive 300 is provided with: a spindle motor 351; an optical pickup 352; a Radio Frequency (RF) amplifier 353; and a servo circuit 354.

The spindle motor 351 is a motor for rotating the optical disc 100.

The optical pickup 352 is an apparatus for recording the record data or the like onto the recording surface of the optical disc 100, by irradiating the recording the surface with a light beam, and reading the record data or the like recorded on the recording surface by receiving reflected light of the light beam. The optical pickup 352 outputs a RF signal corresponding to the reflected light of the light beam.

The RF amplifier 353 amplifies the RF signal outputted from the optical pickup 352 and outputs it to a Coder/Decoder (CODEC) 355. Moreover, the RF amplifier 353 generates, from the RF signal, a wobble frequency signal WF, a track error signal TE, and a focus error signal FE, and outputs them.

The servo circuit 354 is a servo control circuit for controlling the driving of the optical pickup 352 and the spindle motor 351, on the basis of the track error signal TE, the focus error signal FE, and other servo control signals.

Moreover, as shown in FIG. 18, the disc drive 300 is provided with: the CODEC 355; a buffer 356; an interface 357; and a light beam driving device 358.

The CODEC 355 is a circuit, provided with: a function of performing an error correction for the record data upon reading; and a function of appending an error correction code to the record data and modulating the record data upon recording. Specifically, the CODEC 355 demodulates and decodes the RF signal outputted from the RF amplifier 353 upon reading, performs an error correction for the decoded RF signal and then outputs this to the buffer 356. Moreover, if the error correction is impossible as a result of performing the error correction for the decoded RF signal, the CODEC 355 generates an error-correction-impossible signal for indicating that the error correction is impossible, and outputs this signal to a defect detector 359. Upon recording, the CODEC 355 appends the error correction code to the record data outputted from the buffer 356, modulates and encodes this data to have a code suited to the optical characteristics or the like of the optical disc 100 and then outputs the encoded record data to the light beam driving device 358.

The buffer 356 is a memory circuit for storing the record data temporarily.

The interface 357 is a circuit for controlling the input/output or communication of the record data or the like between the disc drive 300 and the backend 400. Specifically, upon reproducing, the interface 357 outputs the record data outputted from the buffer 356 (i.e. the record data read from the optical disc 100) to the backend 400, in response to a request command from the backend 400. Upon recording, the interface 357 receives the record data which is inputted from the backend 400 to the disc drive 300, and outputs this data to the buffer 356. Moreover, the interface 357 outputs all or part of each of the management information 142A to 142C or the like (i.e. each of the management information 142A to 142C, the setting information 141, the index information 143, etc.) stored in a management information generator 360 to the backend 400, in response to a request command from the backend 400.

Upon recording, the light beam driving device 358 generates a light beam driving signal corresponding to the record data outputted from the CODEC 355 and outputs this signal to the optical pickup 352. The optical pickup 352 modulates a light beam on the basis of the light beam driving signal, and irradiates the recording surface of the optical disc 100 with it. By this, the record data or the like is recorded onto the recording surface.

Moreover, as shown in FIG. 18, the disc drive 300 is provided with: the defect detector 359; and the management information generator 360.

The defect detector 359 is a circuit for detecting a defect on the optical disc 100. The defect detector 359 generates a defect detection signal indicating the presence or absence of a defect, and outputs this signal. The defect detector 359 detects a defect on the basis of the result of the error correction of the record data, upon reading information (upon verifying or reproducing). As described above, if the error correction is impossible as a result of performing the error correction for the decoded RF signal, the CODEC 355 generates the error correction impossible signal, and outputs this signal to the defect detector 359. The defect detector 359 outputs the defect detection signal for indicating the presence of a defect when receiving this error correction impossible signal.

The management information generator 360 is a circuit for generating or updating the above-mentioned management information 142A to 142C. For example, it may be constructed to generate or update the management information 142A (i.e. the defect management information 142A), on the basis of the defect detection signal outputted from the defect detector 359. Alternatively, it may be constructed to generate or update the management information 142B (i.e. the space bitmap information 142B) or the management information 142C (i.e. the sequential recording management information 142C), under the control of a CPU 361 described later. Moreover, the management information generator 360 is preferably constructed to generate the setting information 141 and the index information 143 or the like described above. The management information 142A to 142C or the like are rewritably stored into a memory circuit disposed in the management information generator 360. The management information generator 360 outputs the defect management information 140 to the backend 400 through the interface 357, in response to a request command from the backend 400.

Moreover, as shown in FIG. 18, the disc drive 300 has the CPU 361. The CPU 361 controls the disc drive 300 as a whole, and controls the exchange of information among the elements in the disc drive 300 described above. Moreover, the CPU 361 also controls the recording operation and the reading operation for the record data and each of the management information 142A to 142C. The CPU 361 controls the exchange of data between the disc drive 300 and the backend 400, in response to a control command or a request commend transmitted from the backend 400.

Figure 19:
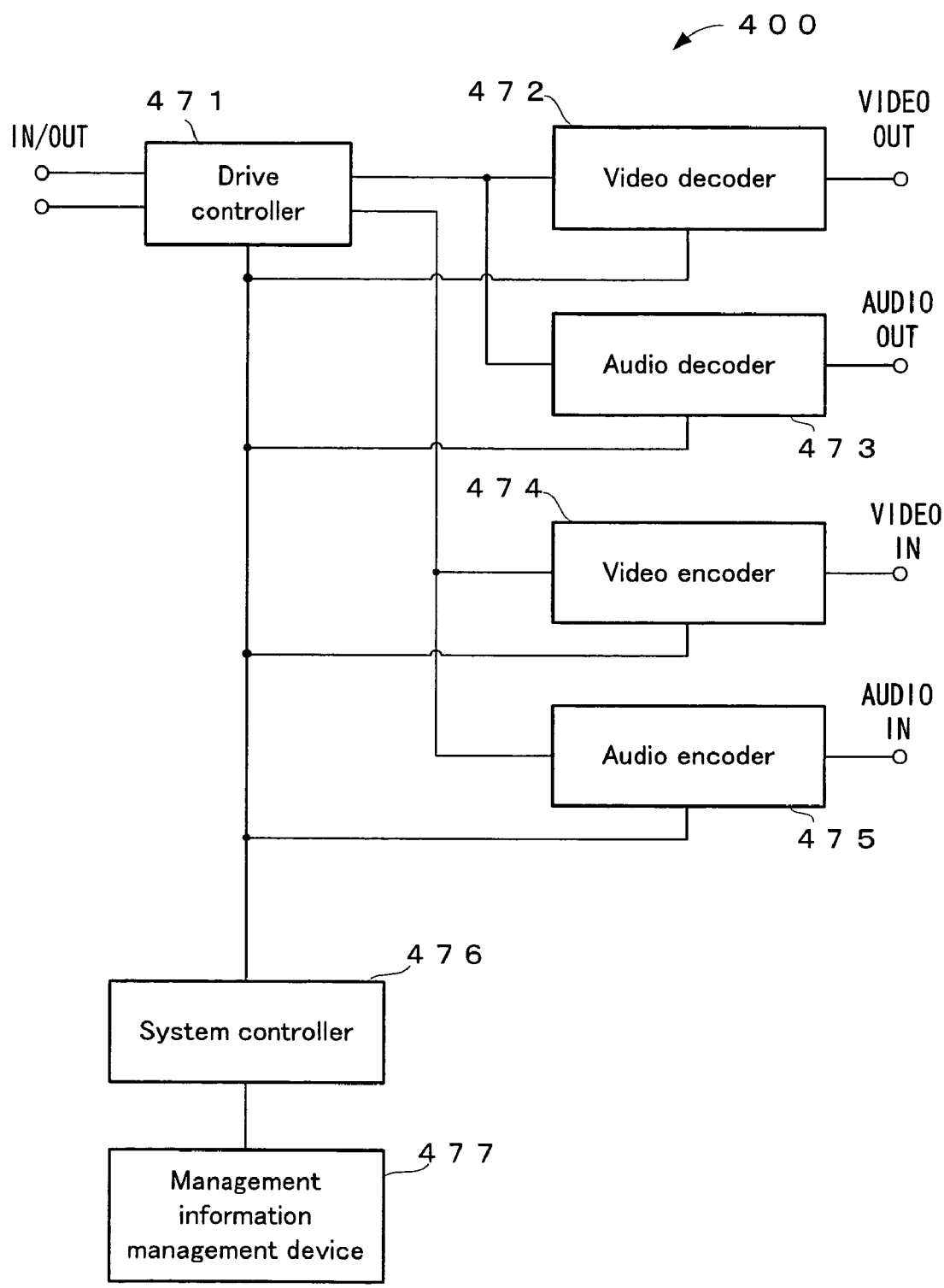
FIG. 19 is a block diagram showing a backend.

Next, FIG. 19 shows the inner structure of the backend 400. The backend 400 is an apparatus for performing reproduction processing with respect to the record data read by the disc drive 300 from the optical disc 100, receiving the record data supplied from the outside in order to record it into the optical disc 100, compressing (and encoding) this record data and transmitting it to the disc drive 300.

The backend 400 is provided with: a drive controller 471; a video decoder 472; an audio decoder 473; a video encoder 474; an audio encoder 475; a system controller 476; and a management information management device 477.

The drive controller 471 is a circuit for controlling the reading processing and recording processing of the disc drive 300. The backend 400 and the disc drive 300 cooperate and perform an operation of reading the record data from the optical disc 100 and reproducing it and an operation of receiving the record data from the outside and recording it onto the optical disc 100. The drive controller 471 realizes the cooperation of the backend 400 and the disc drive 300 by controlling the reading processing and recording processing of the disc drive 300. Specifically, the drive controller 471 outputs to the disc drive 300 request commands about reading, recording, outputting the record data from the buffer 356, outputting each of the management information 142A to 142C from the management information generator 360 and so on. Moreover, the drive controller 471 also performs input and output control for controlling the input and output of the record data, each of the management information 142A to 142C and other various information.

The video decoder 472 and the audio decoder 473 are circuits for decoding the record data which is read from the optical disc 100 by the disc drive 300 and which is supplied through the drive controller 471, and converting the record data to be reproducible with a display, a speaker or the like.

The video encoder 474 and the audio encoder 475 are circuit for respectively receiving a video signal, an audio signal or the like, inputted from the outside for the purpose of recording them onto the optical disc 100, for compressing and encoding them by Moving Picture Experts Group (MPEG) compressing and encoding method or the like, and for supplying them to the disc drive 300 through the drive controller 471.

The system controller 476 is a circuit for controlling: the drive controller 471; the video decoder 472; the audio decoder 473; and the management information management device 477, and performing the processing of reproducing the record data in cooperation with the devices, upon reproducing. Upon recording, the system controller 476 controls: the drive controller 471; the video encoder 474; the audio encoder 475; and the management information management device 477, to thereby record the record data in cooperation with the devices. Upon reproducing and recording, the system controller 476 controls the disc drive 300 (e.g. controls the generation and transmission of various request commands, the reception of a response signal, or the like) with the drive controller 471 in order to realize the cooperation of the disc drive 300 and the backend 400.

The management information management device 477 has therein a memory circuit, and has a function of receiving and maintaining all or part of the management information 142A to 142C or the like, generated or updated by the management information generator 360 in the disc drive 300. The management information management device 477 performs the defect management or other various data management, with the system controller 476.

Figure 20:
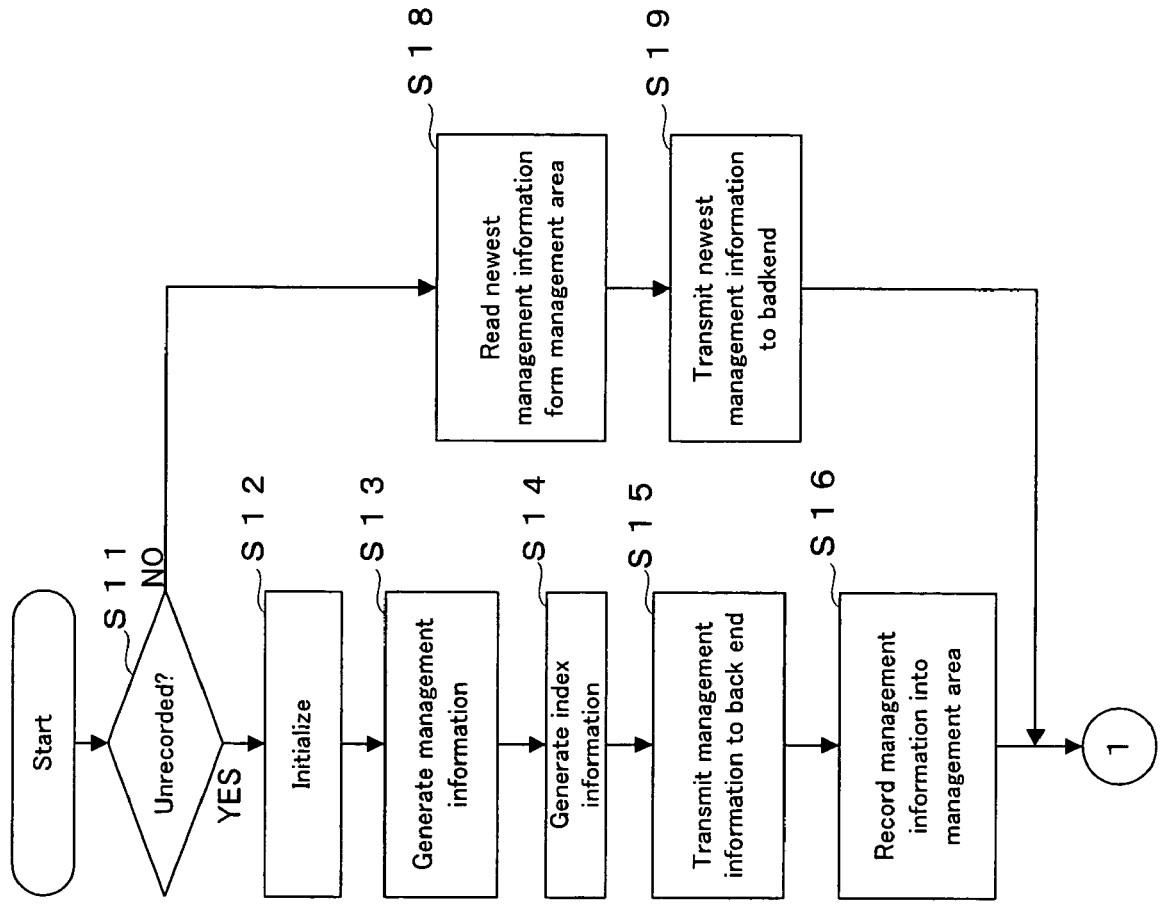
FIG. 20 is a flowchart showing initial setting of the recording/reproducing apparatus.

Next, the initial setting of the recording/reproducing apparatus 200 will be explained. FIG. 20 shows the initial setting of the recording/reproducing apparatus 200. The recording/reproducing apparatus 200 performs the initial setting between until the record data is recorded or reproduced (at the preparation stage of the recording and the reproduction) after the optical disc 100 is loaded to the drive unit 300. The initial setting is processing for preparing for the recording or the reproduction of the record data, and includes various processing. Out of the various processing, the initialization of the optical disc 100, the generation and the recording of the management information 142A to 142C or the like, the transmission of the management information 142A to 142C or the like to the backend 400, or the like will be explained below. The processing is performed mainly under the control of the CPU 361 of the drive unit 300.

As shown in FIG. 20, if the optical disc 100 is loaded into the drive unit 300, the CPU 361 of the drive unit 300 judges whether or not the optical disc 100 is an unrecorded disc (i.e. a blank disc) (step S11).

If the optical disc 100 is an unrecorded disc (the step S11: YES), the CPU 361 initializes the optical disc 100 (step S12). In this initializing, the management information generator 360 generates the management information 142A to 142C (step S13). Incidentally, the management information 142A generated at this time has only an outline, not having any content. Namely, the defect address is not recorded in it, nor is the specific spare address. Moreover, the identifier to specify each of the management information 142A to 142C is also recorded to each of the management information, as the header. The generated management information 142A to 142C are stored and held in the management information generator 360.

Incidentally, at this time, the management information generator 360 preferably obtains the start address and the end address of the user data area 101 set in the initializing, to thereby generate the setting information 141. Even in the setting information 141, the identifier to specify the setting information 141 is preferably recorded as the header. Moreover, the management information generator 360 preferably generates the index information 143 indicating the management information 142A to 142C and the setting information 141.

Then, the management information generator 360 generates the index information 143 (step S14). The index information 143 generated here is recorded following the last management information (specifically the management information 142C as shown in FIG. 14, for example) in the subsequent recording onto the optical disc 100.

Then, the CPU 361 transmits the management information 142A to 142C or the like stored in the management information generator 360, to the backend 400 (step S15). The management information 142A to 142C or the like are stored into the management information management device 477 of the backend 400.

Then, the CPU 361 records the management information 142A to 142C or the like stored in the management information generator 360, into the management area 107A of the optical disc 100 (step S16).

On the other hand, if the optical disc 100 is not an unrecorded disc (the step S11: NO), then, the CPU 361 reads the newest management information from any one of the management areas 107A, 107B and 107C of the optical disc 100 (step S18).

Namely, if the optical disc 100 is not an unrecorded disc, the management information 142A to 142C or the like generated in the past, i.e. one or several setting information 141 and several management information 142A to 142C, are recorded in all or part of the management areas 107A, 107B, and 107C. So, the CPU 361 selects one management area which is currently in use to record the management information, and specifies the index information 143 recorded at the end in the management area. Then, the CPU 361 refers to the specified index information 143, and specifies the management information 142A to 142C minimally required to construct the newest management information and the setting information 141. Then, the CPU 361 reads the newest management information and the setting information 141.

Then, the CPU 361 stores the newest management information and the setting information 141 into the management information generator 360, and transmits this to the backend 400 (step S19). On the backend 400, the newest management information and the like are stored in the management information management device 477.

By virtue of the initial setting described above, the newest management information is stored into the management information generator 360 of the disc drive 300, and is stored into the management information management device 477 of the backend 400. By this, the preparation for the updating of the newest management information is completed on management information generator 360. On the other hand, the preparation for various data management is completed on the management information management device 477.

Figure 21:
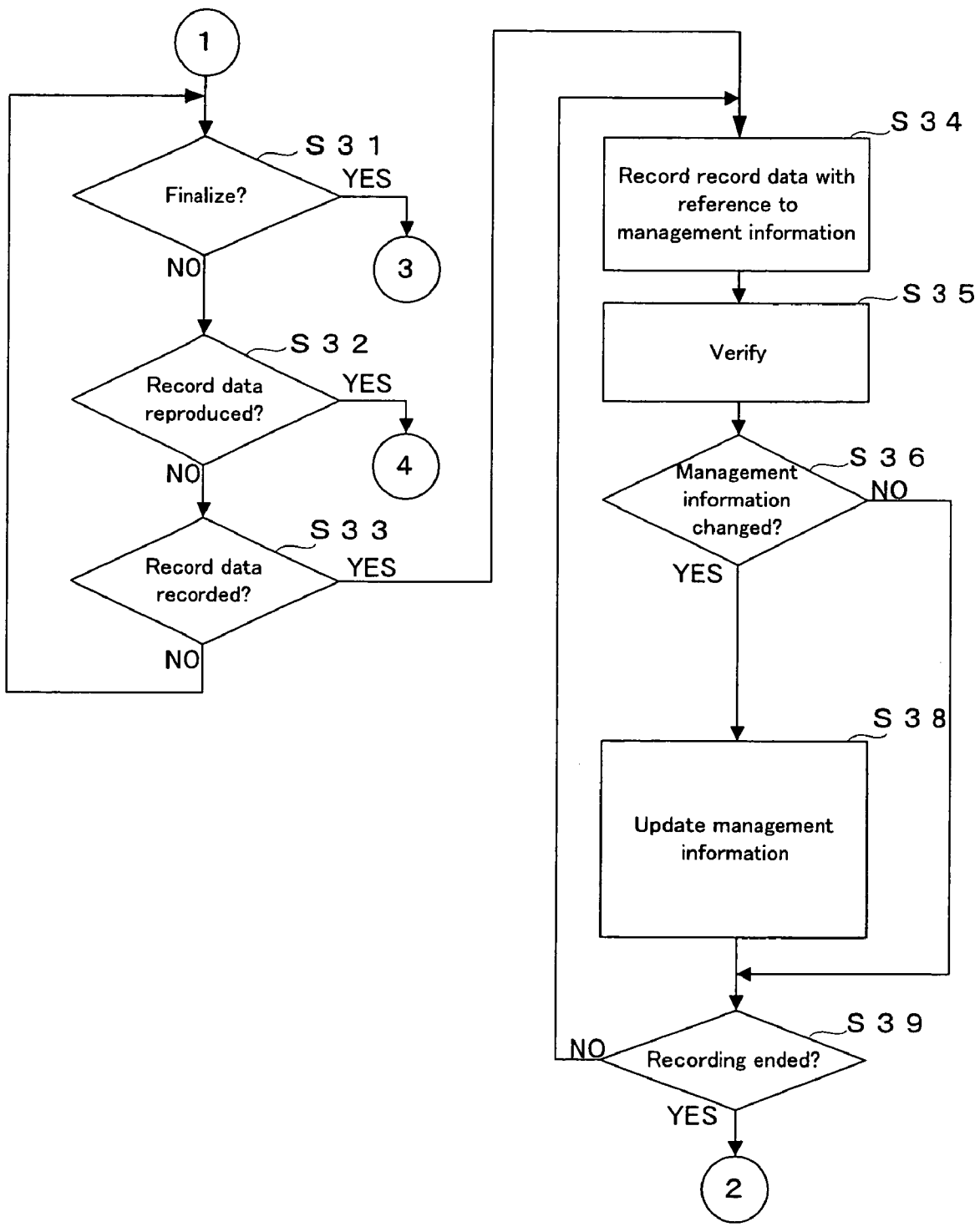
FIG. 21 is a flowchart showing recording of the recording/reproducing apparatus.
Figure 22:
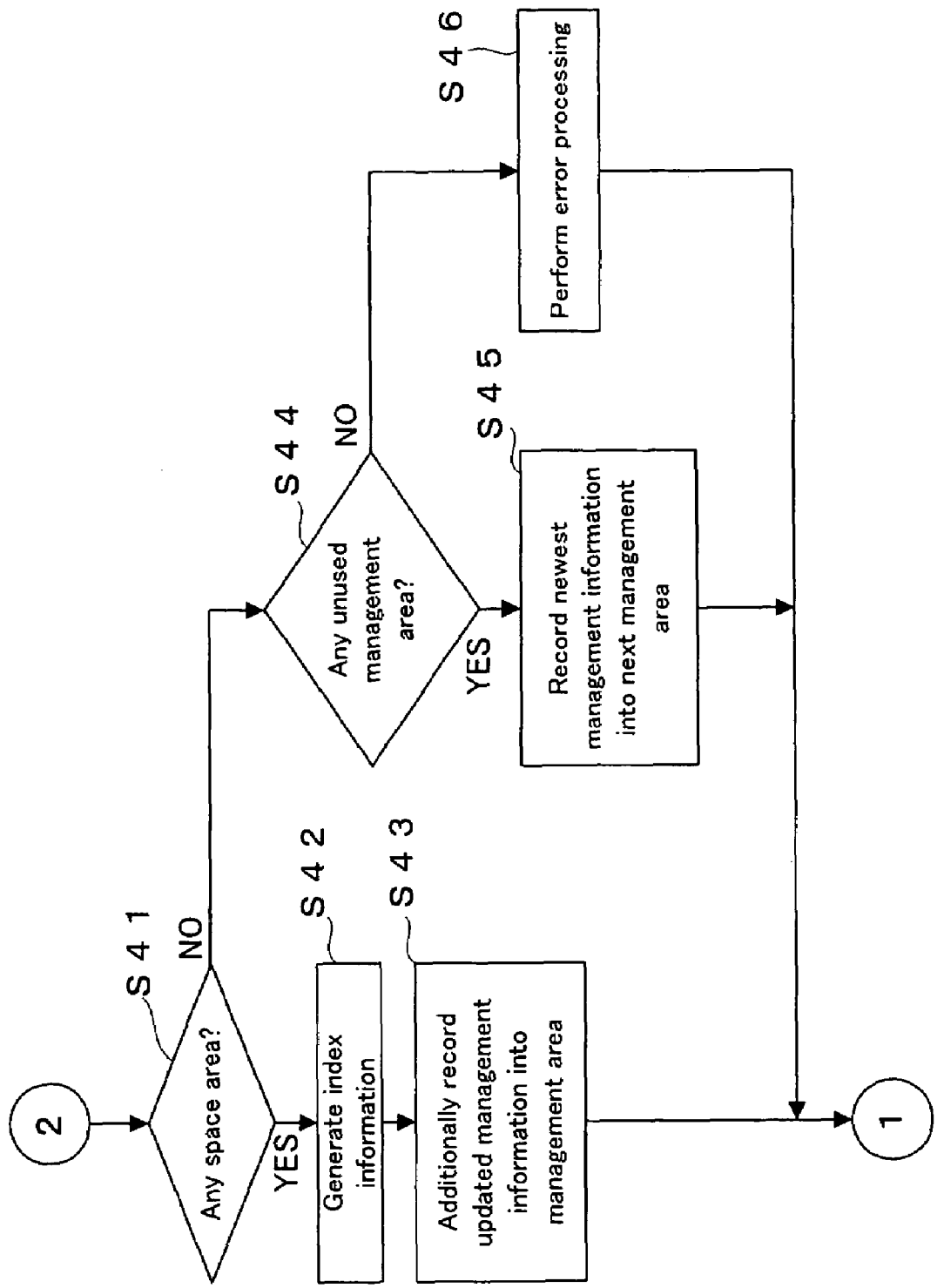
FIG. 22 is a flowchart following the in FIG. 19.

Next, the recording processing of the recording/reproducing apparatus 200 will be explained. FIG. 21 mainly shows the recording processing of the recording/reproducing apparatus 200. The recording/reproducing apparatus 200 performs the processing of recording the record data into the user data area 101 on the optical disc 100. The recording/reproducing apparatus 200 performs verifying during the recording processing, and updates the management information 142A, or the other management information 142B and 142C or the like, on the basis of the result of the verifying. The recording processing is realized by the cooperation of the CPU 361 of the disc drive 300 and the system controller 476 of the backend 400.

As shown in FIG. 21, if a user inputs an instruction to start the recording (step S33: YES), the recording/reproducing apparatus 200 responds to this instruction and records the record data (step S34). The record data is recorded into each predetermined block.

The recording/reproducing apparatus 200 performs verifying at each time of the one block recording (step S35), and judges whether or not to update the management information 142A stored in the management information generator 360, on the basis of the result of the verifying. Alternatively, it judges whether or not to update the other management information 142B and 142C (step S36).

Specifically, if it is recognized, as a result of the verifying, that the record data fails to be recorded, the CPU 361 records the record data which fails to be recorded, into the spare area. Then, the CPU 361 estimates that there is a defect in a place where the record data is supposed to be recorded, and records the defect address indicating the place and the corresponding spare address into the management information 142A. Alternatively, if it is judged that there is a change in the state of distribution of the record data on the optical disc 100 by performing the recording operation, the CPU 361 updates the management information 142B so as to reflect the state of distribution of the record data. Alternatively, if it is judged that there is a change in the state of distribution of the record data on the recording track disposed on the optical disc 100 by performing the recording operation, the CPU 361 updates the management information 142C so as to reflect the state of distribution of the record data.

Incidentally, the verifying is not necessarily performed at each time of one block recording the verifying may be performed at each time of several-block recording or at regular time intervals. Moreover, the updating of the management information 142B and the management information 142C may be not necessarily performed with the verifying, but may be performed during the recording operation, as occasion demands.

When the processing in the above-described steps S34 to S38 with respect to a series of blocks of the record data to be recorded this time ends (step S39: YES), the CPU 361 checks whether or not there is a space area for recording therein the updated management information 142A to 142C and the index information 143 indicating the setting information 141 and the newest management information including the updated management information 142A to 142C in one management area which is in use now to record the management information 142A to 142C or the like (step S41).

If there is a space area in the one in-use management area (the step S41: YES), the CPU 361 generates the index information 143 indicating the newest management information and the setting information 141 (step S42), and additionally records the updated management information 142A to 142C, into the one in-use defect management area (step S43). At this time, the index information 143 is additionally recorded into the one in-use management area, following at least one of the updated management information 142A to 142C.

On the other hand, if there is not any space area in the one in-use management area (the step S41: NO), the CPU 361 checks whether or not there is an un-used management area on the optical disc 100 (step S44).

If there is an un-used management area on the optical disc 100 (the step S44: YES), the CPU 361 designates the un-used management area, as one management area to be used next. Incidentally, if there are a plurality of un-used management areas on the optical disc 100, the CPU 361 designates one of the plurality of un-used management areas, as one management area to be used next. Then, the CPU 361 records the newest management information, into the setup area of the designated one management area (step S45). Specifically, since the newest management information is stored in the management information generator 360, the CPU 361 records one set of management information block 140, provided with: each of the management information 142A to 142C stored in the management information generator 360; the setting information 141; and the index information 143 indicating the management information 142A to 142C and the setting information 141, into the setup area of one management area to be used next (refer to FIG. 6 and FIG. 7).

On the other hand, if there is not any un-used management area on the optical disc 100 (the step S44: NO), the CPU 361 performs error processing, such as displaying an error message on the display panel of the recording/reproducing apparatus 200 (step S46). Then, the recording processing is completed.

Figure 23:
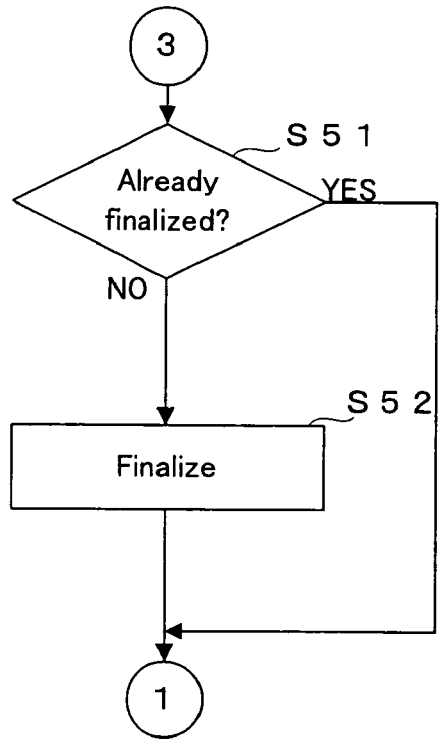
FIG. 23 is a flowchart showing finalizing of the recording/reproducing apparatus.

Next, the finalizing of the recording/reproducing apparatus 200 will be explained. FIG. 23 shows the finalizing of the recording/reproducing apparatus 200. For example, if the user inputs an instruction indicating to finalize (the step S31 in FIG. 21: YES), the recording/reproducing apparatus 200 confirms that the optical disc 100 is not finalized yet (step S51: NO) and finalizes the optical disc 100 (step S52). Upon the finalizing, the recording/reproducing apparatus 200 preferably records the management information 142A stored in the management information generator 360, into a not-illustrated definite defect management area on the optical disc 100. Then, the finalizing is completed.

Figure 24:
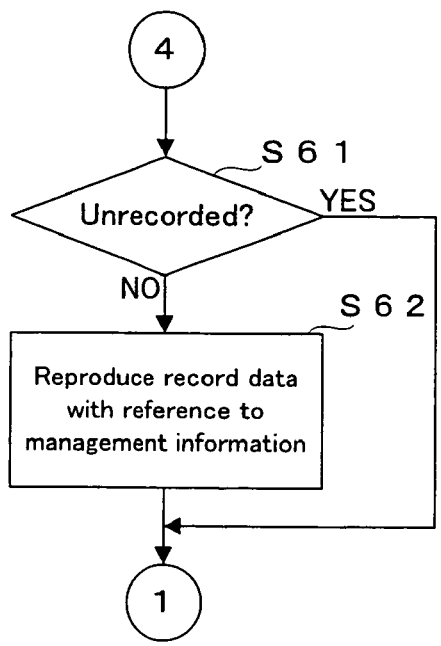
FIG. 24 is a flowchart showing reproduction processing of the recording/reproducing apparatus.

Next, the reproduction processing of the recording/reproducing apparatus 200 will be explained. FIG. 24 shows the reproduction processing of the recording/reproducing apparatus 200.

If the user inputs an instruction to start the reproduction (the step S32 in FIG. 19: YES), the recording/reproducing apparatus 200 confirms that the optical disc 100 is not an unrecorded disc (the step S61: NO), and reproduces the record data recorded in the user data area 101 on the optical disc 100 (step S62). The recording/reproducing apparatus 200 reproduces the record data, while performing various data management (e.g. the defect management, etc.) on the basis of the newest management information stored in the management information management device 477 of the backend 400.

As described above, according to the recording/reproducing apparatus 200, since it is constructed to select only the updated management information and record this into the management area, it is possible to reduce the amount of information recorded into the management area. By this, it is unnecessary to provide the large management area for the recording medium and it is possible to increase the recording capacity for the record data.

Moreover, it is constructed such that if the management area used to record the management information 142A to 142C or the like is changed, the setting information 141, all of the management information 142A to 142C minimally required to construct the newest management information, and the index information 143 are recorded into the management area to be used next (particularly, the setup area thereof). Thus, there are always the setting information 141, all the management information 142A to 142C minimally required to construct the newest management information, and the index information 143, in one management area which is in use. Therefore, next time the newest management information and the setting information 141 are read, it is possible to read the management information 142A to 142C constituting the newest management information, and the setting information 141, by searching only the one management area. Thus, it is possible to quickly obtain the newest defect management information.

Incidentally, the present invention can be changed if desired without departing from the scope or spirit of the invention which can be read from the claims and the entire specification. A write-once-type recording medium, a recording apparatus, a recording method, a reproducing apparatus, a reproducing method, and a computer program that realizes these functions, which accompany such changes, are also intended to be within the technical scope of the present invention.

INDUSTRIAL APPLICABILITY

The write-once-type recording medium, the recording apparatus and the recording method for the write-once-type recording medium, the reproducing apparatus and the reproducing method for the write-once-type recording medium, and the computer program associated with the present invention can be applied to a high-density recording medium, such as an optical disc, a magnetic disc, and a magneto-optical disc, for example, and also applied to a recorder or the like for the high-density recording medium. Moreover, they can be also applied to an information recording apparatus or the like, which are mounted on or can be connected to various computer equipment for consumer use or for business use, for example.

The invention claimed is:

1. A recording apparatus for recording record data onto a write-once-type recording medium comprising: (i) a data area to record therein the record data; (ii) a plurality of management areas in which a plurality of types of defect management information for managing the record data and index information for indicating newest defect management information is recorded a plurality of times; and (iii) a control information recording area to record therein information for controlling recording and reading with respect to the data area, wherein (iv) at least one of the plurality of management area is disposed between the control information recording area and the data area, said recording apparatus comprising:
a first recording device for recording the record data into the data area;
a detecting device for detecting the management area in which newest index information is recorded;
an updating device for updating the defect management information and the index information;
a judging device for judging whether or not the index information and the defect management information which are updated by said updating device can be recorded into the management area which is detected by said detecting device; and
a second recording device for recording the updated index information and all defect management information indicated by updated index information, into another management area in which the updated index information and the all defect management information indicated by the updated index information is recorded, if it is judged by said judging device that the index information and the defect management information which are updated cannot be recorded.

2. A recording method of recording record data onto a write-once-type recording medium comprising: (i) a data area to record therein the record data; (ii) a plurality of management areas in which a plurality of types of defect management information for managing the record data and index information for indicating newest defect management information is recorded a plurality of times; and (iii) a control information recording area to record therein information for controlling recording and reading with respect to the data area, wherein (iv) at least one of the plurality of management area is disposed between the control information recording area and the data area, said recording method comprising:
a first recording process of recording the record data into the data area;
a detecting process of detecting the management area in which newest index information is recorded;
an updating process of updating the defect management information and the index information;
a judging process of judging whether or not the index information and the defect management information which are updated by said updating process can be recorded into the management area which is detected by said detecting process; and
a second recording process of recording the updated index information and all defect management information indicated by the updated index information, into another management area in which the updated index information and the all defect management information indicated by the updated index information is recorded, if it is judged by said judging process that the index information and the defect management information which are updated cannot be recorded.

3. A reproducing apparatus for reproducing record data recorded on a write-once-type recording medium comprising: (i) a data area to record therein the record data; (ii) a plurality of management areas; and (iii) a control information recording area to record therein information for controlling recording and reading with respect to the data area, wherein (iv) a plurality of types of defect management information for managing the record data and index information for indicating newest defect management information is recorded a plurality of times in each of the plurality of management areas, (v) the management area into which a newest index information is recorded is same as the management area into which all defect management information indicated by the newest index information are recorded, and (vi) at least one of the plurality of management area is disposed between the control information recording area and the data area, said reproducing apparatus comprising:
a detecting device for detecting the management area in which newest index information is recorded, from among the plurality of management areas;
an extracting device for extracting the newest index information in the management area which is detected by said detecting device;
an obtaining device for obtaining all defect management information in the management area, into which the newest index information is recorded, indicated by the index information which is extracted by said extracting device; and
a reproducing device for reproducing the record data, on the basis of the defect management information obtained by said obtaining device.

4. A reproducing method of reproducing record data recorded on a write-once-type recording medium comprising: (i) a data area to record therein the record data; (ii) a plurality of management areas; and (iii) a control information recording area to record therein information for controlling recording and reading with respect to the data area, wherein (iv) a plurality of types of defect management information for managing the record data and index information for indicating newest defect management information is recorded a plurality of times in each of the plurality of management areas, (v) the management area into which a newest index information is recorded is same as the management area into which all defect management information indicated by the newest index information are recorded, which are recorded, and (vi) at least one of the plurality of management area is disposed between the control information recording area and the data area, said reproducing method comprising:

a detecting process of detecting the management area in which newest index information is recorded, from among the plurality of management areas;

an extracting process of extracting the newest index information in the management area which is detected by said detecting process;

an obtaining process of obtaining all defect management information in the management area, into which the newest index information is recorded, indicated by the index information which is extracted by said extracting process; and a reproducing process of reproducing the record data, on the basis of the defect management information obtained by said obtaining process.

* * * * *